United States Patent
Chou et al.

(10) Patent No.: US 12,321,751 B2
(45) Date of Patent: Jun. 3, 2025

(54) RE-USE OF SPECULATIVE CONTROL TRANSFER INSTRUCTION RESULTS FROM WRONG PATH

(71) Applicant: Apple Inc., Cupertino, CA (US)

(72) Inventors: Yuan C. Chou, Los Gatos, CA (US); Deepankar Duggal, Sunnyvale, CA (US); Debasish Chandra, Fremont, CA (US); Niket K Choudhary, Santa Clara, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 18/305,173

(22) Filed: Apr. 21, 2023

(65) Prior Publication Data
US 2024/0354111 A1    Oct. 24, 2024

(51) Int. Cl.
G06F 9/38    (2018.01)
G06F 9/30    (2018.01)

(52) U.S. Cl.
CPC .......... G06F 9/3842 (2013.01); G06F 9/3005 (2013.01); G06F 9/3016 (2013.01);
(Continued)

(58) Field of Classification Search
CPC ............... G06F 9/3005; G06F 9/30054; G06F 9/30058; G06F 9/30061; G06F 9/323;
(Continued)

(56) References Cited

U.S. PATENT DOCUMENTS

| 5,185,868 A * | 2/1993 | Tran ...................... G06F 9/3858 |
| | | 712/E9.05 |
| 6,094,716 A | 7/2000 | Witt |

(Continued)

FOREIGN PATENT DOCUMENTS

| JP | 5816298 B2 | 11/2015 |
| KR | 10-2011-0139098 A | 12/2011 |

OTHER PUBLICATIONS

Haitham Akkary, Srikanth T. Srinivasan, and Konrad Lai. 2003. Recycling waste: exploiting wrong-path execution to improve branch prediction. In Proceedings of the 17th annual international conference on Supercomputing (ICS '03). Association for Computing Machinery, pp. 12-21. (Year: 2003).*

(Continued)

*Primary Examiner* — Andrew Caldwell
*Assistant Examiner* — Kasim Alli
(74) *Attorney, Agent, or Firm* — Kowert, Hood, Munyon, Rankin & Goetzel, P.C.; Michael B. Davis; Dean M. Munyon

(57) ABSTRACT

Disclosed techniques relate to re-use of speculative results from an incorrect execution path. In some embodiments, when a first control transfer instruction is mispredicted, a second control transfer instruction may have been executed on the wrong path because of the misprediction. Result storage circuitry may record information indicating a determined direction for the second control transfer instruction. Control flow tracker circuitry may store, for the first control transfer instruction, information indicating a reconvergence point. Re-use control circuitry may track registers written by instructions prior to the reconvergence point, determine, based on the tracked registers, that the second control transfer instruction does not depend on data from any instruction between the first control transfer instruction and the reconvergence point, and use the recorded determined (Continued)

direction for the second control transfer instruction, notwithstanding the misprediction of the first control transfer instruction.

20 Claims, 19 Drawing Sheets

(52) U.S. Cl.
CPC .......... *G06F 9/3822* (2013.01); *G06F 9/3838* (2013.01); *G06F 9/3861* (2013.01)

(58) Field of Classification Search
CPC .. G06F 9/30072; G06F 9/3804; G06F 9/3806; G06F 9/3818; G06F 9/3822; G06F 9/3842; G06F 9/3838; G06F 9/3858; G06F 9/38585; G06F 9/3861
See application file for complete search history.

(56) References Cited

U.S. PATENT DOCUMENTS

| | | | | |
|---|---|---|---|---|
| 7,055,021 | B2* | 5/2006 | Kadambi | G06F 9/3838 |
| | | | | 712/E9.05 |
| 10,990,403 | B1* | 4/2021 | Pusdesris | G06F 9/3844 |
| 11,157,284 | B1* | 10/2021 | Ishii | G06F 9/3844 |
| 11,269,642 | B2* | 3/2022 | Kothinti Naresh | G06F 9/3812 |
| 2003/0167348 | A1 | 9/2003 | Greenblat | |
| 2004/0225870 | A1* | 11/2004 | Srinivasan | G06F 9/3848 |
| | | | | 712/E9.05 |
| 2004/0255104 | A1* | 12/2004 | Akkary | G06F 9/3858 |
| | | | | 712/E9.06 |
| 2005/0138480 | A1* | 6/2005 | Srinivasan | G06F 9/3861 |
| | | | | 712/E9.05 |
| 2005/0149698 | A1* | 7/2005 | Yeh | G06F 9/3854 |
| | | | | 712/217 |
| 2007/0110053 | A1 | 5/2007 | Soni et al. | |
| 2008/0270774 | A1 | 10/2008 | Singh et al. | |
| 2010/0274992 | A1 | 10/2010 | Chou et al. | |
| 2011/0320787 | A1 | 12/2011 | Dieffeuderfer et al. | |
| 2012/0290820 | A1 | 11/2012 | Olson et al. | |
| 2014/0075156 | A1 | 3/2014 | Blasco-Allue et al. | |
| 2014/0229721 | A1 | 8/2014 | Forsyth et al. | |
| 2016/0350116 | A1* | 12/2016 | Reddy | G06F 9/30058 |
| 2016/0378483 | A1 | 12/2016 | Burger et al. | |
| 2018/0129500 | A1 | 5/2018 | Koreu et al. | |
| 2020/0004542 | A1* | 1/2020 | Chauhan | G06F 9/3804 |
| 2021/0019149 | A1 | 1/2021 | Chauhan et al. | |
| 2022/0113976 | A1* | 4/2022 | Kothinti Naresh | G06F 9/3844 |
| 2022/0137977 | A1 | 5/2022 | Kothinti Naresh et al. | |
| 2022/0334844 | A1* | 10/2022 | Zhou | G06F 9/3861 |
| 2022/0374241 | A1* | 11/2022 | Kothinti Naresh | G06F 9/3861 |

OTHER PUBLICATIONS

Eyerman et al., "Enabling Branch-Mispredict Level Parallelism by Selectively Flushing Instructions," 54th Annual IEEE/ACM International Symposium on Microarchitecture, Proceedings; Proceedings of the Annual International Symposium on Microarchitecture, Belgium, Oct. 18, 2021.

Eric Rotenberg and Jim Smith, "Control independence in trace processors," Publication Proceedings of the Annual International Symposium on Microarchitecture, North Carolina State Univ., Nov. 16-18, 1999.

J.D. Collins, "Control Flow Optimization Via Dynamic Reconvergence Prediction," Publication Proceedings of the 37th Annual International Symposium on Microarchitecture, Department of Computer Science and Engineering, University of California, San Diego, CA, Institute of Electrical and Electronics Engineers Computer Society, Jan. 1, 2004.

International Search Report and Written Opinion in PCT Appl. No. PCT/US2024/023306 mailed Aug. 1, 2024, 9 pages.

\* cited by examiner

*Example branch live-out table (BLOT) fields*

| Valid 502 | Live-out mask 504 | Reconv. PC (RPC) 506 | RPC found? 508 | Reconv. LIT index 510 | Reconv. BIT index 512 | BIT index 514 |

FIG. 5A

*Example live-out mask vector (LOM)*

| Bit per architectural register 516 |

FIG. 5B

*Example branch re-use table (BRT) fields*

| Valid 520 | PC hash 522 | Direction 524 | Direction valid? 526 |

FIG. 5C

*Example reconvergence table (RT) fields*

| Valid 530 | Hashed PC tag 532 | Reconv PC 534 | LRU 536 |

FIG. 5D

*Example load information table (LIT) fields*

| Valid 540 | PC hash 542 | Destination PR tag 544 | Destination PR valid 546 | ROB group number 548 | Wrap 549 |
|---|---|---|---|---|---|

FIG. 5E

*Example load re-use table (LRT) fields*

| Valid 550 | PC hash 552 | Destination PR tag 554 | Destination PR valid 556 |
|---|---|---|---|

FIG. 5F

*Example LIT register valid array (LRVA)*

| Bit per physical register to indicate which are written by loads in LIT entries 560 |
|---|

FIG. 5G

*Example LIT index map (LIM) entry*

| Reconvergence LIT index 570 |
|---|

FIG. 5H

*Example BLOT and LOM values over time for Fig. 2A code example*

| Valid | Live-out mask | Reconv. PC (RPC) | RPC found? | Reconv. LIT index | Reconv. BIT index | BIT index |
|---|---|---|---|---|---|---|
| | | | | | | |

After instruction 5 rename (beq target1)

| | | | | | | |
|---|---|---|---|---|---|---|
| 1 | 0000000000000000 | target1 | 0 | | | 6 |

After renaming instructions in CD region

| | | | | | | |
|---|---|---|---|---|---|---|
| 1 | 0001001000000000 | target1 | 0 | | | 6 |

Reach reconvergence

| | | | | | | |
|---|---|---|---|---|---|---|
| 1 | 0001001000000000 | target1 | 1 | 6 | 8 | 6 |

Mis-prediction and flush: when branch executes, CAM the BLOT using BIT index, copy live-out mask to LOM, deallocate BLOT entry

Live-out mask after instruction 9 rename on correct path

| |
|---|
| 0000001000000000 |

Live-out mask after instruction 11 rename on correct path

| |
|---|
| 0000001000000100 |

*FIG. 6*

RE-USE OF SPECULATIVE CONTROL TRANSFER INSTRUCTION RESULTS FROM WRONG PATH

CROSS REFERENCE TO RELATED APPLICATIONS

This application is related to the following U.S. Application filed on Apr. 21, 2023: U.S. application Ser. No. 18/305,151, entitled "Re-use of Speculative Load Instruction Results from Wrong Path," which is hereby incorporated by reference as if entirely set forth herein.

BACKGROUND

Technical Field

This disclosure relates generally to computer processors and more particularly to re-using speculative instruction results in the context of mispredicted branches.

Description of Related Art

Mispredictions of control transfer instructions (e.g., branches) are costly for performance in computer processors. Typically, instructions on the "wrong" path (the path that was predicted incorrectly) are flushed and the front-end of the processor is re-directed to the correct path. This may essentially waste execution of instructions that were speculatively executed on the wrong path and delay execution of instructions on the correct path. Therefore, substantial engineering effort has been expended on improving the accuracy of branch predictors. Some data-dependent branches remain very difficult to predict, however.

BRIEF DESCRIPTION OF DRAWINGS

FIGS. 5A-5H are diagrams illustrating example data structures utilized by the re-use logic, according to some embodiments.

FIG. 6 is a diagram illustrating example re-use logic state during execution of the code example of FIG. 2A, according to some embodiments.

DETAILED DESCRIPTION

Figure 1:
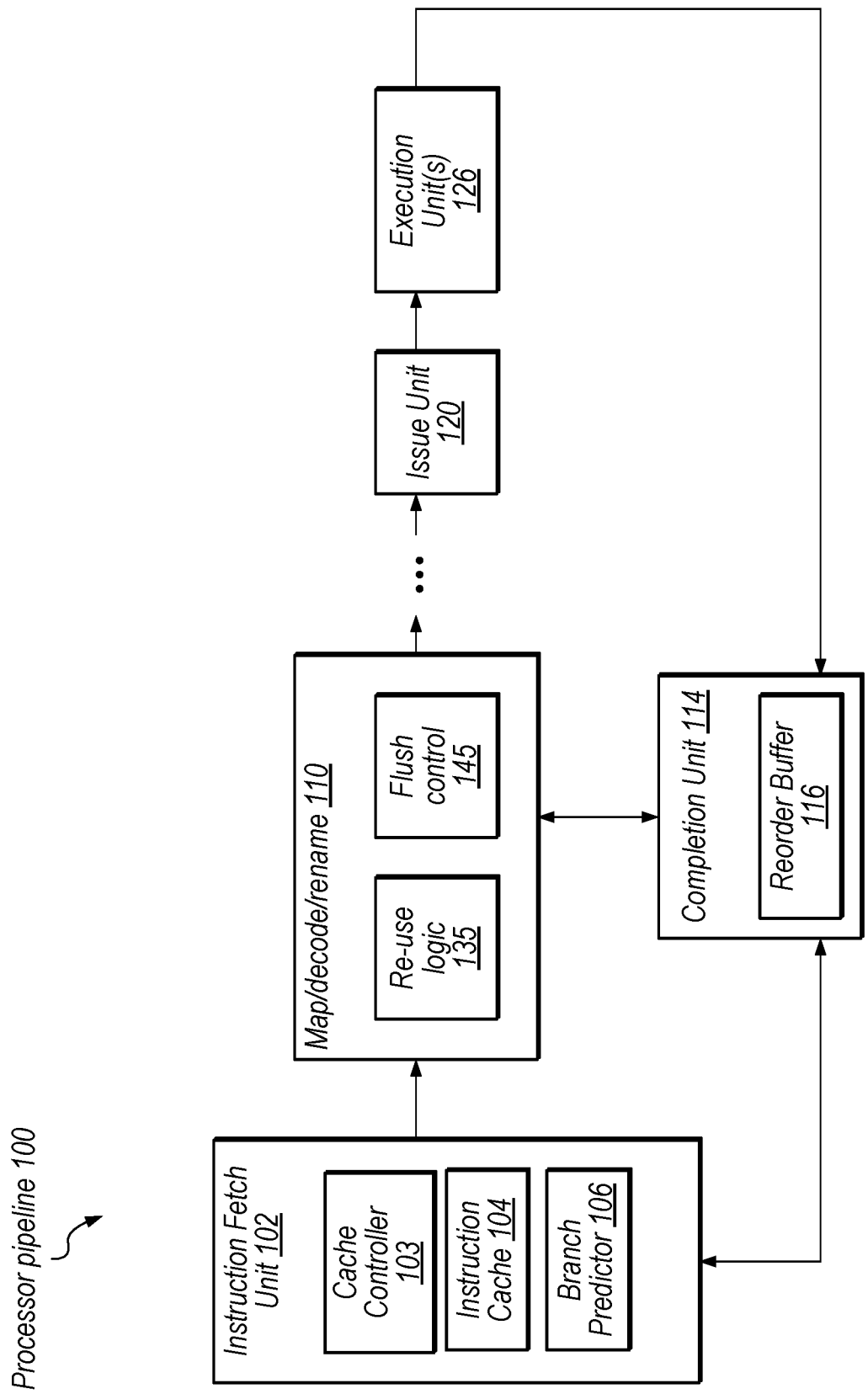
FIG. 1 is a diagram illustrating an example processor pipeline, according to some embodiments.

To reduce the performance impacts of mispredicted control transfer instructions, it may be desirable to re-use some of the speculative results from executing instructions on the wrong path. This may involve identifying instructions that are control independent (e.g., instructions that are executed regardless of the direction of the control transfer) and data independent (e.g., instructions that do not depend on data generated by instructions on the bad path). In some embodiments, control circuitry retains and re-uses results from such instructions after a flush and redirect due to a misprediction.

To identify control independent instructions, note that the different paths from a given control transfer instruction may eventually reconverge at a reconvergence point. Instructions on the bad path prior to the reconvergence point are "control dependent" (CD) while instructions after the reconvergence point are "control independent" (CI). As discussed above, some of those instructions are also "data independent" (DI), e.g., when they do not depend on data from any executed instructions from the bad path. Results from control independent and data independent (CIDI) instructions may be re-used (instead of completely flushed) if they can be properly identified (whereas control independent but data dependent (CIDD) instructions need to be executed again).

In disclosed embodiments, circuitry is configured to re-use instruction results (e.g., branch and load results) that are determined to be CIDI. This may include identifying the reconvergence point (after which instructions are control independent) and tracking data independent instructions.

As a detailed example, a branch live-out table (BLOT) may include an entry per branch that tracks that branch's reconvergence point and tracks registers written prior to the reconvergence point using a "live-out" mask. Generally speaking, the live-out mask indicates whether results from the bad path live out into the control independent region. When a branch is executed and determined to have been mispredicted it may cause instructions from the bad path to be flushed and some of them may be re-executed on the correct path. In this scenario, the live-out mask vector is updated to clear registers written after the reconvergence point (in the control independent region) by instructions whose input operands are independent. Therefore, instructions in the control independent region are CIDI and may be re-used if all their source registers are clear in the live-out mask, in some embodiments.

In the meantime, the results (e.g., the load values and branch directions) of younger speculatively-executed instructions are stored during execution on the bad path. Note that speculative results are stored during speculative execution, in various embodiments, prior to detecting a misprediction of an older branch. If the results of some of those instructions turn out to be CIDI after a misprediction, control circuitry re-uses those results after the flush instead of re-executing the instructions.

In particular, a load information table (LIT) and load re-use table (LRT) are configured to store the tags of destination physical registers that hold values from younger speculatively-executed loads, in some embodiments. On a mispredict, the load information table contents after the reconvergence point are copied to the load re-use table. The destination physical register of a CIDI load in the load re-use table is prevented from being freed and is then re-assigned to the load as a valid physical register after the flush (re-using the previously-determined value in the physical register instead of re-executing the load). In other embodiments, other techniques may be used to retain load values, e.g., storing the load value itself in a re-use table.

As another example, a branch information table (BIT) and branch re-use table (BRT) are configured to store the directions of younger speculatively executed branches, in some embodiments. Re-use of branch directions may both avoid re-calculating the direction and avoid mispredictions for those branches.

Detailed techniques are discussed below, including techniques and circuitry relating to: finding reconvergence points, fast updates for the live-out mask that tracks data dependencies, advanced tracking structures that may allow reduced sizes for other structures, example conditions for re-use, etc.

In various embodiments, one or more predictors are configured to predict the direction and target of control transfer instructions (e.g., branches). It is noted that throughout this disclosure, the terms "control transfer instruction," "program flow instruction" and "branch instruction" may be used interchangeably. Such instructions include at least conditional branch instructions, call instructions, return instructions, jump instructions, etc. Additionally, while the term "branch instruction" or (or more briefly, "branch") may be used throughout this disclosure, it should be understood that the term applies to any type of control transfer instruction that may be utilized in an instruction set architecture.

Processor Pipeline Overview

Turning now to FIG. 1, a block diagram illustrating one embodiment of a processor pipeline 100 is shown. In some embodiments, the logic of processor pipeline 100 is included in one or more cores of a central processing unit (CPU). Processor pipeline 100 includes instruction fetch unit (IFU) 102. Fetched instructions are sent from the IFU 102 to map/decode/rename unit 110 and eventually to issue unit 120. Issue unit 120 is coupled to issue instructions to any of a number of instruction execution resources including execution unit(s) 126 (and potentially other units such as a load store unit (LSU), and/or a floating-point/graphics unit (FGU)). The instruction execution resources may be coupled to a working register file. It is noted that the illustrated embodiment is merely one example of how processor pipeline 100 is implemented. In other embodiments, processor pipeline 100 includes other components and interfaces not shown in FIG. 1. Alternative configurations and variations are possible and contemplated.

Completion unit 114 includes reorder buffer (ROB) 116 and coordinates transfer of speculative results into the architectural state of processor 100. Entries in ROB 116 are allocated in program order. Completion unit 114 includes other elements for handling completion/retirement of instructions and/or storing history including register values, etc. In some embodiments, speculative results of instructions are stored in ROB 116 before being committed to the architectural state of processor 100, and confirmed results are committed in program order. Entries in ROB 116 are marked as completed when their results are allowed to be written to the architectural state. Completion unit 114 also coordinates instruction flushing and/or replaying of instructions.

The reorder buffer 116 is coupled to IFU 102, map/decode/rename unit 110, a working register file, and the outputs of any number of instruction execution resources for supporting out-of-order instruction execution. In an embodiment, each of the instruction cache 104 and a data cache are level-one (L1) caches of a cache memory hierarchical subsystem. In such an embodiment, the cache, if present, is a level-two (L2) data cache and the cache controller is a level-two (L2) cache controller. In some embodiments, the level-one (L1) caches (e.g., instruction cache 104 and an unshown L1 data cache) are at the lowest level in the cache memory hierarchy and directly connected to the processor 100.

In various embodiments, the IFU 102 also includes the branch predictor 106 for predicting the outcome of branch instructions in order to remove control dependencies in the code. In various embodiments, the IFU 102 also includes a return address stack (not shown). IFU 102 also includes a number of data structures in addition to those shown such as an instruction translation lookaside buffer (ITLB), instruction buffers, and/or other structures configured to store state that is relevant to thread selection and processing (in multi-threaded embodiments of processor 100).

In some embodiments, IFU 102 uses the upper-level cache controller 103 to fetch instructions from upper-level instruction cache 104 and buffer them for downstream processing. The upper-level cache controller 103 may also request data from a lower-level cache or from memory through the lower-level cache controller 140 in response to instruction cache misses. The instructions that are fetched by IFU 102 in a particular clock cycle are referred to as a fetch group, with the fetch group including any number of instructions, depending on the embodiment. In one embodiment, map/decode/rename unit 110 prepares fetched instructions for further processing such as by inspecting opcodes of the fetched instructions, determining register identifiers for source and destination operands, and performing register rename operations.

Map circuitry maps the decoded instructions (or uops) to physical registers within processor 100. The map unit also implements register renaming to map source register addresses from the uops to the source operand numbers identifying the renamed source registers. Dispatch circuitry dispatches uops to reservation stations (not shown) within the various execution units. Issue unit 120 sends instruction sources and data to the various execution units for picked (i.e., scheduled or dispatched) instructions. In some embodiments, issue unit 120 reads source operands from the appropriate source, which varies depending upon the state of the pipeline.

In some embodiments, processor pipeline 100 includes a working register file that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced. Instructions issued from issue unit 120 proceed to one or more of the illustrated execution units to be performed. In one embodiment, each of execution unit(s) 126 is similarly or identically configured to perform certain integer-type instructions defined in the implemented ISA, such as arithmetic, logical, and shift instructions.

In the illustrated example, circuitry 110 includes re-use logic 135 and flush control circuitry 145. Flush control circuitry 145, in some embodiments, is configured to flush speculatively-executed instructions in response to mispredicted control transfer instructions. In some embodiments, flush control 145 is configured to interact with re-use logic 135 to retain some instruction results from the bad path for potential re-use. For example, flush control 145 may refrain from freeing certain physical registers whose contents may be reused.

Re-use logic 135, in some embodiments, implements various structures configured to track speculative execution and determine whether speculative results from a bad path can be re-used, e.g., if they are control and data independent.

Note that while re-use logic 135 and flush control 145 are located in stage 110 in the illustrated example, all or a portion of this circuitry may be implemented in other stages in other embodiments.

Program Code Examples with Control Independent Regions

Figure 2A:
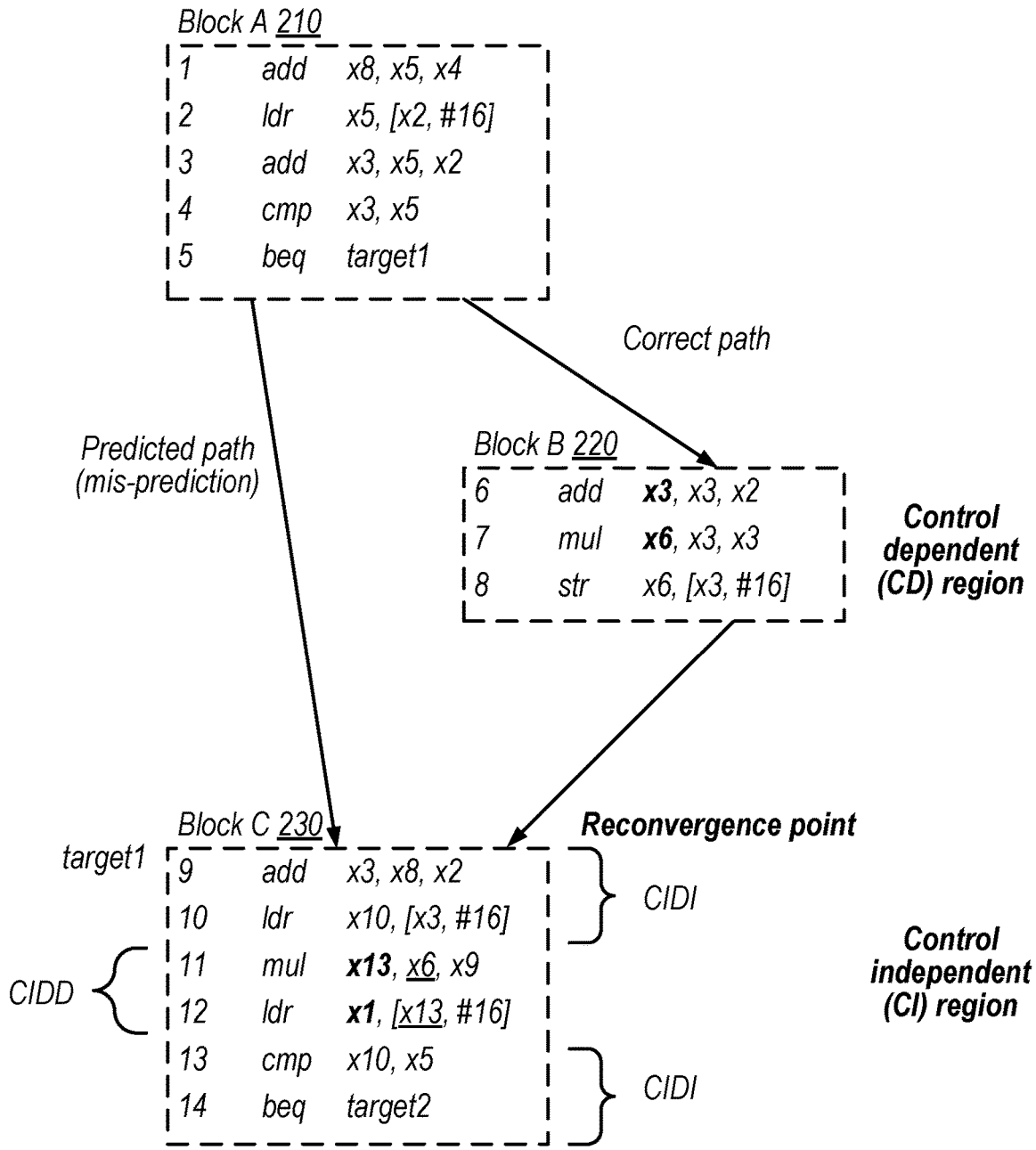
FIGS. 2A-2D are diagrams illustrating example code samples with control and data independent regions, according to some embodiments.

FIG. 2A is a diagram illustrating an example code sample 200 with three blocks. Block A 210, in the illustrated example, includes five instructions and ends with a conditional control transfer instruction (branch if equal). As shown, there is a misprediction that the branch will be taken, but the correct path actually falls through to instruction 6 (the first instruction of block B 220).

As shown, the reconvergence point for instruction 5 is instruction 9 (an add). This point will be reached eventually, regardless of whether branch instruction 5 is taken or not. The instructions between instruction 5 and the reconvergence point are in the control dependent region, because whether or not they should be executed depends on the result of the corresponding control transfer instruction (instruction 5).

The instructions 9-14 in block C 230, however, are in the control independent region for instruction 5 because they follow the reconvergence point. As shown, the control independent region includes both data dependent instructions (11 and 12) and data independent instructions (9, 10, 13, and 14. Instructions 11 and 12 are data dependent because they depend on results of instructions in the control dependent region. In particular, instruction 11 uses register x6 as an input operand, which was written by instruction 7. Similarly, instruction 12 uses register x13 as an input operand, which was written by instruction 11, which in turn depends on the control dependent region as discussed above.

In the illustrated code examples discussed herein, a bold register identifier represents a register being written that will cause a data dependency for any instructions that use that register as an input. An underlined register identifier represents an input operand register whose value depends (either directly or indirectly) on a register written in the control dependent region.

In contrast, the data independent instructions do not rely on data produced by the control dependent region. If these instructions are properly identified, their results may be re-used. For example, instruction 10 loads a value into register x10 and instruction 14 computes a branch direction and target (target 2). These values may utilize substantial processing time and their re-use may advantageously improve performance, reduce power consumption, or both.

Figure 2B:
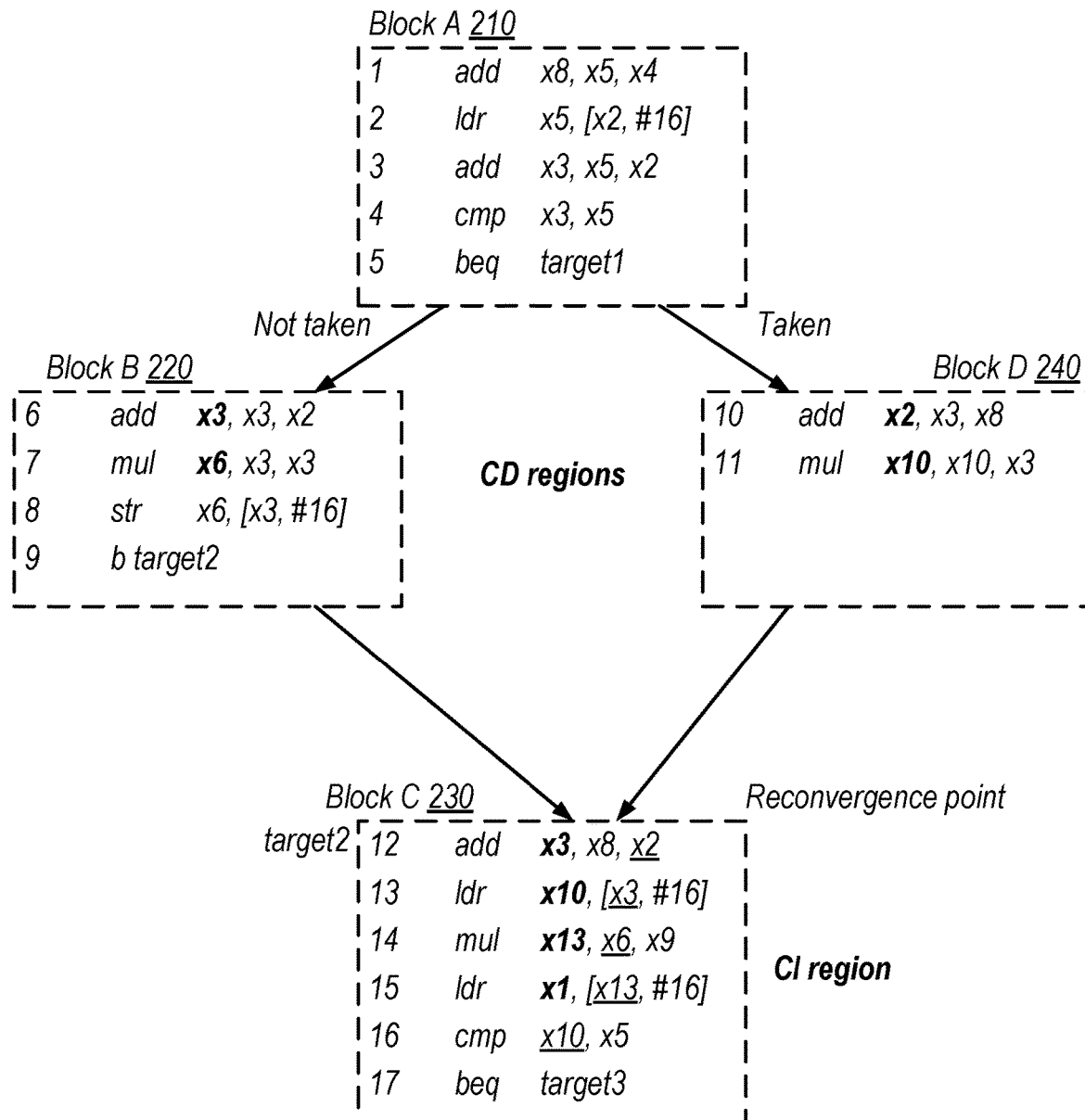

FIG. 2B is a diagram illustrating an example "double hammock" program code sample 202. In this example, there are two separate control dependent regions corresponding to Block B 220 and block D 240. In this example, instructions 12-16 all have data dependencies on instructions from a control dependent region.

Figure 2C:
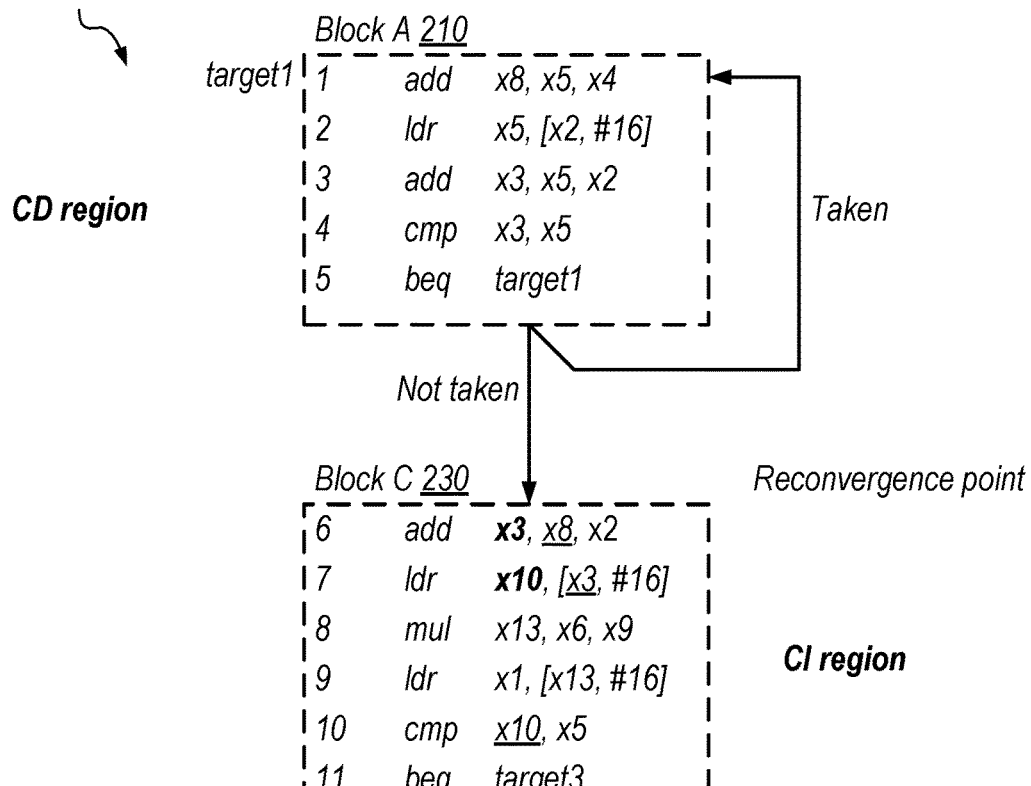

FIG. 2C is a diagram illustrating an example loop closing program code sample 204. In this example, block C 230 is a control independent region and block A 210 is a control dependent region, for the instruction 5 branch. Instructions 8 and 9 are data independent in this example.

Figure 2D:
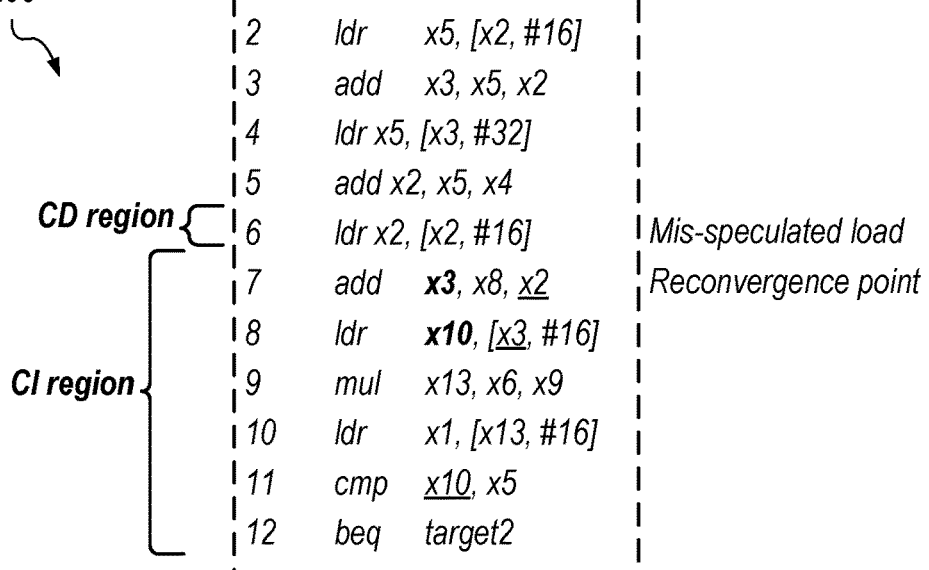

FIG. 2D is a diagram illustrating an example load misprediction program code sample 206. This example may occur in the context of load address prediction or load value prediction, where the instruction 6 load is speculatively executed based on a predicted address or predicted load value. In this example, the misprediction means that the reconvergence point is instruction 7 and the load itself is a control dependent region. Instructions 9 and 10 in this example are data independent. Various techniques discussed in detail herein for re-using values from speculatively-executed control independent and data independent (CIDI) instructions in the context of control transfers may similarly be utilized in the context of other mispredictions, such as mispredicted loads.

Overview of Re-Use Techniques and Example Re-Use Logic

Figure 3:
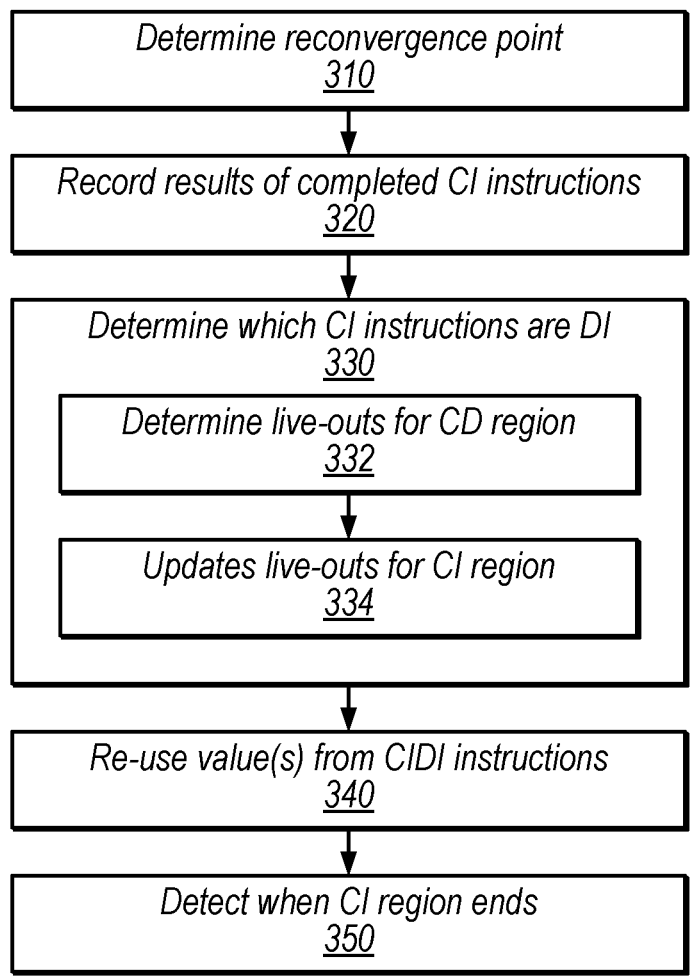
FIG. 3 is a flow diagram illustrating an example re-use technique for control and data independent instruction(s), according to some embodiments.
Figure 4:
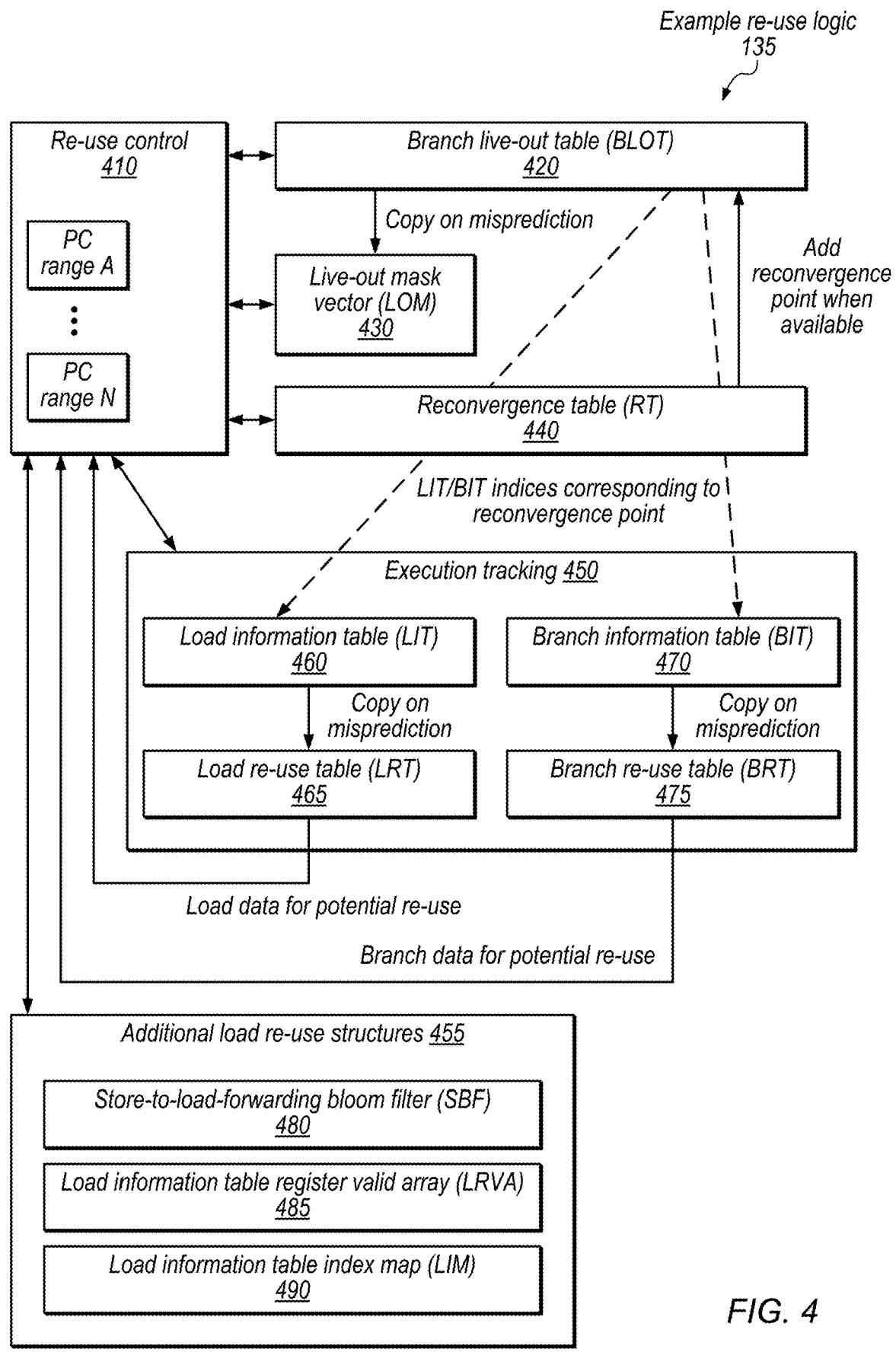
FIG. 4 is a block diagram illustrating detailed example re-use logic configured to re-use branch and load results, according to some embodiments.

In the following discussion, FIG. 3 provides an overview of re-use techniques, FIGS. 4-5H provide detailed example logic and structures for some embodiments and FIG. 6 provides an example corresponding to the code sample of FIG. 2A.

FIG. 3 is a diagram illustrating an example method for re-using data from control independent and data independent operations, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated embodiment, control circuitry determines a reconvergence point for a given control transfer instruction. At 320, control circuitry records results of completed control independent instructions (which follow the reconvergence point). Note that these results may or may not be recorded prior to identification of the reconvergence point.

At 330, in the illustrated embodiment, the control circuitry determines which control independent instructions are also data independent. As shown, this includes determining live-outs for the control dependent region (e.g., a live-out mask that indicates registers written in that region) at 332 and updating live-outs for the control independent region at 334 (e.g., setting additional fields in the live-out mask if CI instructions that depend on set registers write additional registers, clearing fields in the live-out mask if CI instructions that are data independent overwrite registers with their fields in the live-out mask set, or both).

At 340, in the illustrated embodiment, control circuitry re-uses one or more values from control independent and data independent instructions (e.g., values recorded at 320). For example, this may include using a speculative load value (e.g., by preventing remapping of a target physical register and assigning that register for the replayed load). As another example, this may include using the branch target or branch direction for a speculatively-executed branch instruction. Note that the term "re-use" is used herein to refer to use of a speculative value, e.g., after flush and replay, but it is not intended to imply that the value is necessarily used more than once. Rather, the "re-use" may be the first actual use of the value in terms of committing results to the architectural state of the processor. Re-use implies that not all speculative data was flushed. The term "re-use" is also helpful for explanation, in the sense that traditionally, values on the wrong path would be thrown away rather than re-used for any subsequent operations.

At 350, in the illustrated embodiment, control circuitry detects when the control independent region ends. The control circuitry may invalidate one or more storage or tracking data structures at this point, e.g., for use to track other control transfer instructions.

FIG. 4 is a block diagram illustrating detailed example re-use logic configured to re-use branch and load results, according to some embodiments.

In the illustrated example, re-use logic 135 includes re-use control circuitry 410, branch live-out table circuitry (BLOT) 420, live-out mask vector (LOM) circuitry 430, reconvergence table (RT) circuitry 440, execution tracking circuitry 450, and circuitry for additional load re-use structures 455.

Re-use control 410, in some embodiments, is configured to access and update various illustrated structures based on instructions currently being executed. Generally, re-use control 410 is configured to store results for speculatively-executed instructions, track data dependencies, and determine when speculative results from a bad path can be used after a misprediction is detected.

Branch live-out table 420, in some embodiments, includes a number of entries configured to store information for control transfer instructions. In some embodiments, re-use control 410 is configured to allocate an entry in branch live-out table 420 in response to encountering a conditional control transfer instruction when there is an entry available in the branch live-out table 420. In some embodiments, only certain classes of control transfer instructions are tracked, e.g., non-biased conditional branches. Further, in some embodiments only branches that are predicted not-taken or branches that are predicted taken and hit in the reconvergence table 440 are tracked in branch live-out table 420.

Various information may be tracked for a given branch in branch live-out table 420, such as a live-out mask, a reconvergence program counter (PC), and indices into other structures of FIG. 4, for example. Detailed fields for entries of branch live-out table 420 are discussed below with reference to FIG. 5A. Re-use control 410 may stop updating the live-out mask for a branch live-out table 420 entry in response to finding the reconvergence point for that entry.

In some embodiments, re-use control 410 is configured to invalidate an entry in branch live-out table 420 in response to a threshold number of branches being renamed before a reconvergence point is found. Re-use control 410 may also deallocate an entry in branch live-out table 420 when the corresponding branch completes and its direction was accurately predicted.

Live-out mask vector 430, in some embodiments, is configured to track live-out information. When a branch with an entry in branch live-out table 420 executes and a misprediction is detected, re-use control 410 is configured to copy the live-out mask from branch live-out table 420 into live-out mask vector 430. Live-out mask vector 430 may then continue tracking live-out information to facilitate accurate re-use. In some embodiments, live-out mask vector 430 includes a field (e.g., a bit) per architectural register that indicates whether the architectural register was written by instructions in the control dependent region (or by instructions in the control independent region that depend on inputs generated by the control dependent region).

Reconvergence table 440, in some embodiments, is configured to store reconvergence points for branches. Reconvergence table 440 may be tagged based on the PC of a given branch and entries may store the PC of the reconvergence point for that branch. Reconvergence table 440 may implement a replacement policy (e.g., an LRU policy) to determine when to evict entries when a new entry needs to allocate and no entries are invalid. Re-use control may read the reconvergence table on allocation of a branch live-out table entry and on a branch misprediction. In some embodiments, on a miss in the reconvergence table, re-use control assumes that the reconvergence PC is equal to the branch target.

In some embodiments, re-use control 410 is configured to store information relating to PC's (e.g., copied from the reorder buffer 116) of instructions on the wrong path and then CAM against that information after a misprediction-caused flush to find the reconvergence point (where the reconvergence point occurs when there is a hit for a replayed instruction with a PC from the previously-executed instructions). In this context a "CAM" operation refers to determining whether a value is present in a content-addressable memory (CAM). In some embodiments, utilizing the branch information table 470, re-use control 410 is configured to store ranges of PC's corresponding to branches in a wrong-path buffer and CAM against those ranges to find the reconvergence point. This may allow a much smaller structure to CAM against relative to checking all PC's. In some embodiments, there may be a timeout mechanism to stop searching for a reconvergence point if it is not found.

Further, re-use control 410 may store information for an arbitrary number of branches/ranges, e.g., which may imprecisely track the reconvergence point and pessimistically mark some control independent instructions as control dependent. This may still provide satisfactory performance improvements for certain implementations while reducing area and power consumption of the control circuitry.

Execution tracking circuitry 450, in the illustrated embodiment, includes load information table (LIT) 460, load re-use table (LRT) 465, branch information table (BIT) 470, and branch re-use table (BRT) 475. Generally, these structures may store speculative values during execution for potential re-use if a branch is mispredicted.

Load information table 460, in some embodiments, is configured to store information for speculatively executed loads. In some embodiments, this includes load result values themselves. In other embodiments, it encodes information that identifies the location of load result values, such as a destination physical register. Load information table 460 may also store execution status information for loads. In some embodiments, load information table 460 is a circular buffer and may be implemented using multiple banks.

In some embodiments, re-use control 410 is configured to allocate an entry in load information table 460 at the rename stage for a given load. In some embodiments, re-use control 410 overwrites the oldest entry when load information table 460 is full. Re-use control 410 may de-allocate an entry in load information table 460 when the load retires or is flushed.

Load re-use table 465, in some embodiments, is configured to store copied information for loads younger than the reconvergence point from load information table 460 in response to detecting a misprediction. This may preserve load value information even after a flush and front-end redirect. In some embodiments, load re-use table 465 is also a circular buffer.

Re-use control 410 may read and deallocate entries in load re-use table 465 in first-in first-out (FIFO) order when renaming loads on the correct path. Re-use circuitry may also determine the end of the control independent region based on failing to match a renamed load to an entry in load re-use table 465 (which may be tagged using load PC's).

Branch information table 470, in some embodiments, is configured to store information for speculatively-executed branch instructions. In some embodiments, this includes the direction of a speculatively-executed branch instruction. In some embodiments, branch information table 470 is a circular buffer.

Branch re-use table 475, in some embodiments, is configured to store copied information for branches younger than the reconvergence point from branch information table 470 in response to detecting a misprediction. This may preserve branch information even after a flush and front-end redirect.

Re-use control 410 may read and deallocate entries in branch re-use table 475 in FIFO order when renaming branches on the correct path. Re-use circuitry may also determine the end of the control independent region and end re-use attempts based on failing to match a renamed branch to an entry in branch re-use table 475 (which may be tagged using branch PC's) or the branch re-use table 475 becoming empty.

Re-use structures 455, in the illustrated embodiment, include store-to-load-forwarding Bloom filter (SBF) 480, load information table register valid array (LVRA) 485, and load information table index map (LIM) 490. Generally, these structures may provide additional functionality for properly re-using load results or increasing the efficiency of other structures.

Store-to-load-forwarding Bloom filter (SBF) 480, in the illustrated embodiment, is configured to handle memory dependencies for loads. Note that loads may have both register dependencies and memory dependencies. In the illustrated embodiment, the live-out table tracks register dependencies but not memory dependencies. Therefore, a store on the bad path to the same location as a load may mean that the speculative load value is incorrect.

In some embodiments, re-use control 410 is configured to optimistically allow loads to proceed, even if there are stores to the same location, but in response to detecting that a load retrieved data was written by a store in the control dependent region, is configured to set an entry in store-to-load-forwarding Bloom filter (SBF) 480 based on the PC of the load (and may flush the pipeline).

Re-use control 410, in some embodiments, is configured to not re-use load values for loads that hit in the store-to-load-forwarding Bloom filter (SBF) 480. In other embodiments, re-use control 410 may check for memory dependencies (e.g., by including memory addresses in live-out mask information) and may not allow load re-use for loads with potential memory dependencies at all.

Load information table register valid array 485, in some embodiments, is configured to track physical registers that are potentially relevant to load re-use and prevent freeing of those registers on a flush. In particular, array 485 may include a field (e.g., a bit) per physical register and may record physical registers written by loads in entries of load information table 460.

Load information table index map 490, in some embodiments, is configured to map an index in branch information table 470 to a reconvergence load information table index.

This may allow a reduction in the size of the branch live-out table 420, e.g., by not requiring an entry in table 420 for every branch.

FIG. 5A is a diagram illustrating example fields of branch live-out table 420, according to some embodiments. In the illustrated embodiment, table 420 includes valid field 502, live-out mask 504, reconvergence program counter (RPC) 506, RPC found field 508, reconvergence point LIT index 510, reconvergence BIT index 512, and BIT index 514.

Valid field 502 may indicate whether an entry is valid. Live-out mask 504 may include a bit per architectural register and may track registers written on the bad path. Note that the live-out mask 504 may be completely clear when copied to live-out mask vector 430 for predicted-taken branches.

Reconvergence PC 506 may indicate the program counter of the reconvergence point for the branch corresponding to the entry. RPC found field 508 may indicate whether the reconvergence point has been found for the branch. As discussed above, re-use control 410 may invalidate an entry if the reconvergence point has not been found after a threshold number of branches have been allocated.

The reconvergence point load information table index 510 indicates the index in load information table 460 corresponding to the reconvergence point. This may allow copying of entries in the load information table 460 to the load re-use table 465 that are younger than the convergence point, for potential re-use. Similarly, the reconvergence branch information table index 512 may be used to properly copy entries from the branch information table 470 to the branch re-use table 475.

Branch information table index 514, in some embodiments, indicates the index in the branch information table corresponding to the branch itself. When branches execute and match their prediction, re-use control 410 may CAM the index 514 in table 420 and deallocate a matching entry.

FIG. 5B is a diagram illustrating an example live-out mask vector 430, according to some embodiments. In this example, live-out mask vector 430 includes a bit per architectural register as an array 516. In other embodiments, live-out information may be encoded using other techniques. As discussed above, live-out mask vector 430 may be initially copied from the branch live-out table on a misprediction and then updated to properly reflect register dependencies.

FIG. 5C is a diagram illustrating example fields of branch re-use table 475, according to some embodiments. In the illustrated example, the fields include valid field 520, PC hash 522, direction 524, and direction valid 526.

Valid field 520 indicates whether an entry is currently valid. The PC hash 522 is a hash of the program counter of the corresponding branch and is used to identify the entry for that branch. The direction 524 indicates the direction of the branch and may be updated once a branch is speculatively executed. The direction valid field 526 indicates the execution status of the branch (e.g., whether the branch has actually executed sufficiently for the direction field to be valid). In other embodiments, the branch re-use table 475 may include one or more fields associated with targets of speculatively-executed branches (e.g., the target itself, an identifier of a storage location for the target, a field that indicates whether the target is valid, etc.).

FIG. 5D is a diagram illustrating example fields of reconvergence table 440, according to some embodiments. In the illustrated example, the fields include valid field 530, hashed PC tag 532, reconvergence PC 534 and least-recently used (LRU) 536.

The hashed PC of a given branch serves as the tag 532, in this example. The reconvergence PC 534 is the reconvergence point for a given branch. The LRU field 536 is used to determine which entry to replace when all entries are valid and a new entry is needed.

In some embodiments, re-use control 410 allocates an entry in reconvergence table 440 when the reconvergence point is found for a given branch and CAMs the branch PC to populate fields of a branch live-out table entry. In some embodiments, re-use control 410 is configured to allocate an entry in reconvergence table 440 only when the reconvergence point is different than the branch target. If a branch does not hit in the reconvergence table 440, it may be assumed that the reconvergence point is the same as the branch target.

FIG. 5E is a diagram illustrating example fields of load information table 460, according to some embodiments. In the illustrated example, the fields include valid field 540, PC hash 542, destination physical register tag 544, destination physical register valid 546, reorder buffer (ROB) group number 548, and wrap 549.

Re-use control 410 may allocate an entry for each load, may populate various fields when the load speculatively completes. On a mis-predict, re-use control may copy certain fields to the load re-use table 465 (e.g., CAMing the PC hash to determine entries younger than the reconvergence point).

The PC hash 542 identifies the load associated with an entry. The destination physical register tag 544 indicates the destination physical register of that load. The destination physical register valid field 546 indicates execution status, e.g., whether the physical register has been written. The ROB group number 548 indicates the reorder buffer group of the load and the wrap value 549 indicates whether one or more wraps of the circular buffer have occurred. This may allow identification of individual loads, in some embodiments.

As discussed above, in other embodiments the load information table 460 and load re-use table 465 may store actual load values, or some other encoding of load values rather than identifications of physical registers. Identifying physical registers may reduce the overall size of these tables, however, e.g., due to the relatively smaller number of bits used to identify physical registers.

FIG. 5F is a diagram illustrating example fields of load re-use table 465, according to some embodiments. In the illustrated embodiment, the valid 550, PC hash 552, destination PR tag 554, and destination PR valid fields are similar to those in the branch information table 470 and may be copied from the load information table 460 in response to a misprediction.

In some embodiments, re-use control 410 is configured to re-use a speculatively-executed load by using the destination physical register tag from field 554 and leaving a register value array bit set for that physical register when the PC hash 552 matches the current PC after a redirect, field 556 indicates that the destination physical register is valid, the live-out mask indicates that the load is data independent, and there is not a hit in the Bloom filter 480.

If there is not a hit in the load re-use table when encountering a load after a flush and re-direct, re-use control 410 may determine that the control independent region has ended and may deallocate remaining entries in load re-use table 465.

FIG. 5G is a diagram illustrating an example load information table register valid array 485, according to some embodiments. In the illustrated embodiment, array 560 includes a bit per physical register that indicates which physical registers are written by loads in load information table entries. These bits may be written as load information table 460 entries are read to populate the load re-use table 465. Physical registers that are not set in the array 560 may be returned to a free list while registers that are set are prevented from being freed, allowing potential re-use.

FIG. 5H is a diagram illustrating an example entry in load information table index map 490, according to some embodiments. In the illustrated example, a given entry indicates the reconvergence load information table index for a given branch information table index. In the illustrated example, there is an entry at the same index in LIM 490 for each entry in the branch information table 470.

This may avoid needing a branch live-out table entry for each branch. For example, in some embodiments, re-use control 410 is configured to populate entries in LIM 490 for predicted-taken branches but only configured to assign branch live-out table entries for predicted-not-taken branches. Re-use control 410 may properly identify the index in load information table 460 associated with the reconvergence point for branches that do not have entries in the branch live-out table. Note that information from the branch live-out table may not be needed for those branches that are predicted-taken, because no registers would be written on the fall-through path (which is not speculatively executed due to the taken prediction) and the live-out mask would be all zeros. This may allow implementation of a smaller branch live-out table, which may reduce circuit area and power consumption, in some embodiments.

In other embodiments, the information in LIM 490 may be included as a field in branch information table 470 entries.

Note that in other embodiments, circuitry 460 and 465 may be combined, circuitry 470 and 475 may be combined, or both (instead of copying from 460 to 465 or from 470 to 475 on a mispredict). Further while the illustrated encodings are included for purposes of illustrating, they are not intended to limit the scope of the present disclosure. In other embodiments, various other encodings may be used for the illustrated structures. Further, while loads and branches are discussed, similar techniques may be used to re-use values from various other types of instructions. Further, the term "instruction" is intended to be construed broadly to include various encodings of processor operations, including but not limited to API instructions, micro-operations generated based on decoded instructions, etc.

Live-Out and Re-Use Example

FIG. 6 is a diagram illustrating example re-use logic state during execution of the code example of FIG. 2A, according to some embodiments. Generally, FIG. 6 shows a series of execution points (with relatively earlier events closer to the top of the figure and relatively later events closer to the bottom) The first three rows show values of fields in the branch live-out table 420 at different execution points and the last two rows show values of the live-out mask 430 at different execution points.

As shown, after rename of the conditional branch instruction 5 ("beq target 1"), the table 420 valid bit is set, the live-out mask is all zeros, the reconvergence PC is target 1, the reconvergence PC has not been encountered, and the branch information table index is six.

After renaming instructions in the control dependent region (based on the misprediction that the branch is not taken), the live-out mask has been updated to reflect writes to physical registers x3 and x6.

After reaching the reconvergence point, the RPC found field is set. Also, the indices of the load information table 460 and branch information table 470 are populated (to six and eight, in this example).

As shown, the mis-prediction is detected and a flush occurs. When the branch executes, re-use control 410 CAMs the branch live-out table using the branch information table index of the mispredicted branch, copies the live-out mask from table 420 to the live-out mask vector 430, and deallocates the entry in table 420.

The processor is redirected to the correct path (starting at instruction 9) and re-use control 410 updates the live-out mask vector 430 appropriately. In particular, after rename of instruction 9, re-use control 410 clears the bit for register x3, because that register is overwritten and is no longer dependent on data from the control dependent region.

For instruction 10, re-use control 410 may CAM the load re-use table 465. If the load was speculatively-executed, re-use control 410 may map the previously-written physical register identified by field 554 to x10 and avoid re-executing instruction 10.

As shown, after rename of instruction 11, re-use control 410 has updated the live-out mask vector to indicate that x13 corresponds to a data dependency (because it is written based on a multiply operation that used register x6 as an input, which was written in the control dependent region).

In the example of FIG. 2A, instruction 14 may also be re-used. For example, re-use control may CAM the branch re-use table using the PC of instruction 14 and use the direction in field 524 if the conditional branch has already been speculatively executed, based on the fact that the x10 and x5 registers being compared do not have dependencies indicated in the live-out mask vector 430.

Example Fast Live-Out Mask Update Techniques

Figure 7:
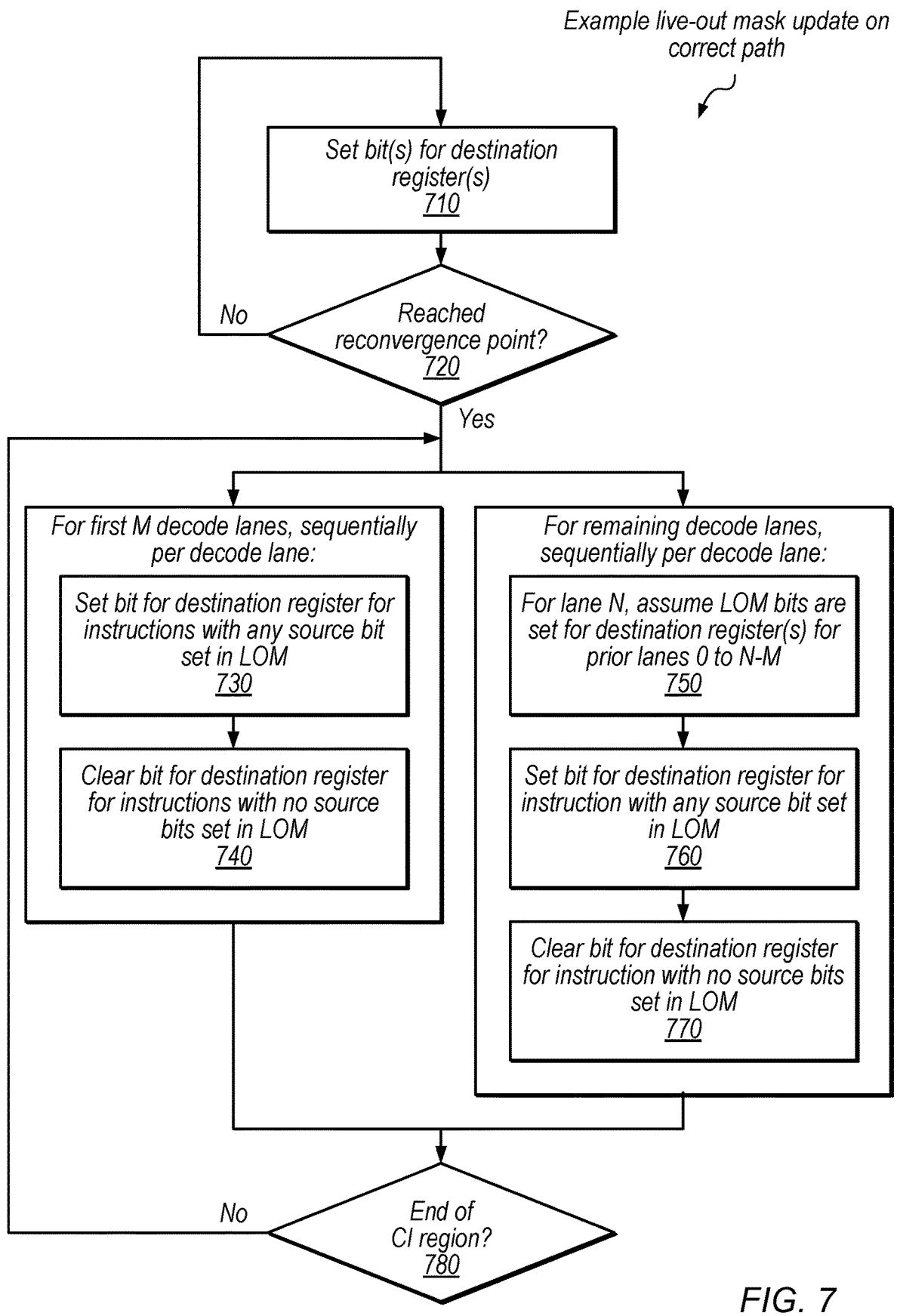
FIG. 7 is a flow diagram illustrating example fast live-out mask update techniques, according to some embodiments.

FIG. 7 is a flow diagram illustrating example fast live-out mask update techniques, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

Generally, updating the live-out mask should be performed quickly, e.g., in a single cycle. This may be challenging, however, for processors that decode multiple instructions in a decode group, due to the need to check for dependencies associated with other instructions in the same decode group. Therefore, in some embodiments, re-use control is configured to update the live-out mask using an imprecise update. This technique may be conservative in the sense that it sometimes flags false dependencies, but it may ensure that no dependencies are missed and allow for fast update of the live-out mask.

In the example of FIG. 7, the processor supports decode groups having up to P instructions (where P is an integer) and includes P decode lanes. The disclosed operations may be performed in a rename pipeline stage, for example.

At 710, prior to reaching the reconvergence point, control circuitry, sets bits in the live-out mask for destination registers written by instructions (potentially on the bad path, if a branch was predicted not taken but is actually taken).

At 720, control circuitry determines whether the reconvergence point has been reached. If not, flow proceeds back to 710. If so, flow proceeds to 730 and 750. In this example, flow proceeds in parallel for the first M decode lanes at elements 730 and 740 and the remaining decode lanes at 750-770.

At 730, in the illustrated example, control circuitry sets a live-out mask bit for a destination register for an instruction with any source bit set in the live-out mask (LOM). Said another way, if an instruction has an input operand whose bit is set in the live-out mask, the live-out mask bit for that instruction's destination register is set.

At 740, in the illustrated example, control circuitry clears a bit for a destination register for instructions that have no source bits set in the live-out mask. Because these instructions do not depend on data from the bad path, their overwriting of a destination register means that the destination register no longer has a data dependency. Note that, for a given instruction at most one of the operations of elements 730 or 740 may be performed.

The operations of elements 730 and 740 are performed sequentially for the first M decode lanes, e.g., starting with lane 0, then lane 1, then lane 2, and so on. Thus, when the operations occur for the second decode lane, the live-out mask has been updated based on the first decode lane, and so on (where an earlier decode lane corresponds to an older instruction).

At 750, in the illustrated example, a given lane N of the remaining decode lanes, control circuitry assume that live-out mask bits are set for destination registers of the instructions in the prior lanes 0 to N-M (this corresponds to assuming that those instructions are data dependent). This means that lane N does not need to wait for results from those earlier lanes, reducing the critical path of the live-out mask computation but potentially introducing false positive dependencies.

At 760, control circuitry sets a live-out mask bit for destination registers for an instruction with any source bit set in the live-out mask. At 770, control circuitry clears a bit for a destination register for an instruction with no source bits sets in the live-out mask. The live-out masks for elements 760 and 770 are simulated based on the assumption that the prior lanes 0 to N-M were data dependent, as discussed above.

At 780, control circuitry determines whether the end of the control independent region has been reached. If so, instruction re-use for the mispredicted branch may end. If not, flow proceeds back to 730 and 750.

Referring back to the code example of FIG. 2A, if M were equal to 4 then the last two instructions 13 and 14 would be conservatively marked as data dependent using the technique of FIG. 7.

Note, however, that in other embodiments, the live-out mask is updated to precisely reflect dependencies. For example, in some embodiments, elements 730 and 740 of FIG. 7 may be performed sequentially for all decode lanes and elements 750-770 may be omitted, providing precise live-out mask updates.

Example Conditions on Use Instruction Results from the Bad Path

Figure 8:
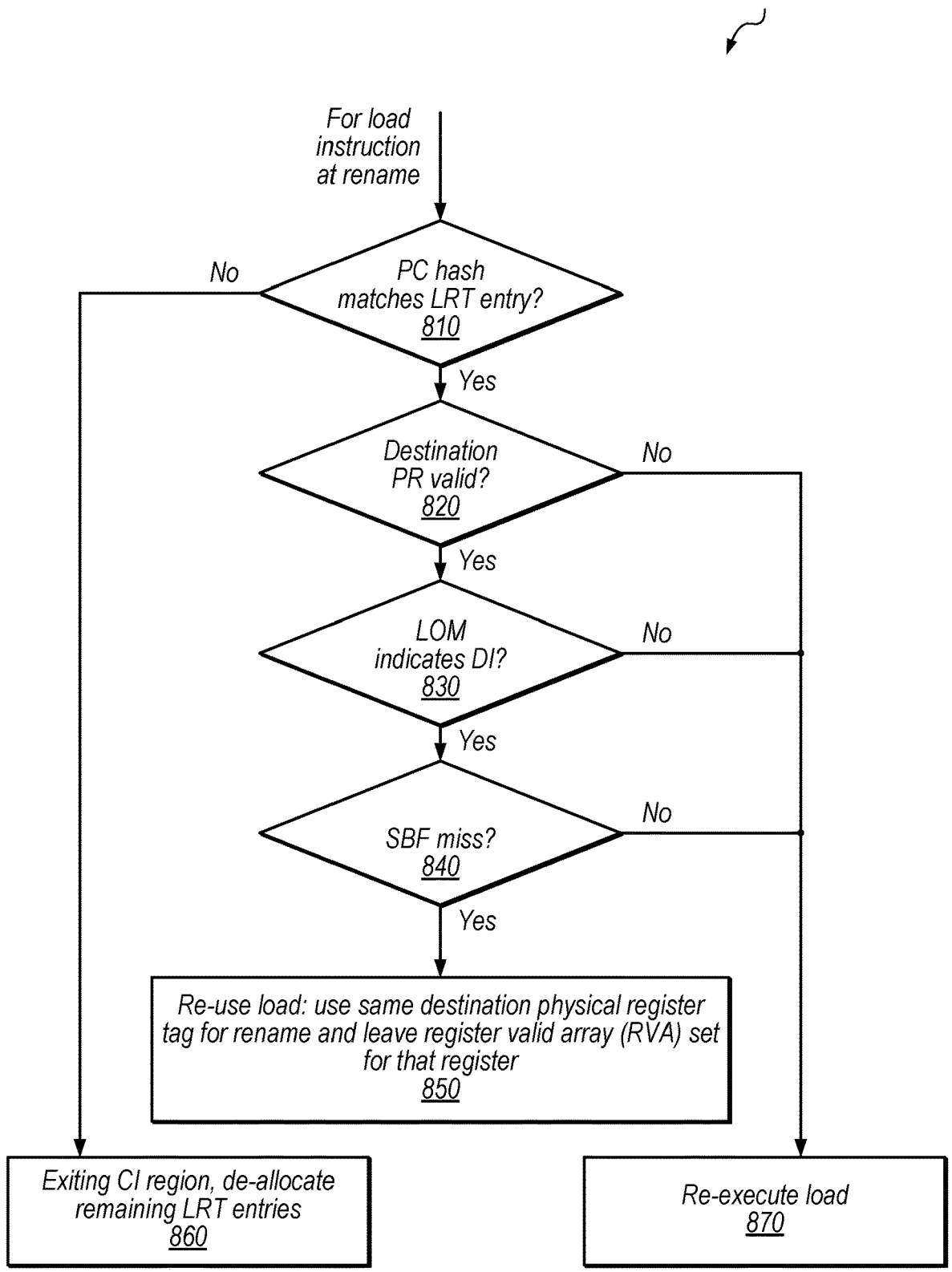
FIG. 8 is a flow diagram illustrating an example load value re-use technique, according to some embodiments.

FIG. 8 is a flow diagram illustrating an example load value re-use technique, according to some embodiments. At 810, in the illustrated example, control circuitry receives a load instruction for rename (e.g., after a flush due to a misprediction, such that result information for the load is potentially saved in the load re-use table 465). The control circuitry determines whether a hash of the program counter of the load matches an entry in the load re-use table. If not, flow proceeds to 860, the control independent region is exited, and the control circuitry deallocates remaining load re-use table entries.

If the hash of the program counter matches an entry in the load re-use table 465, flow proceeds to 820 and control circuitry checks whether the destination physical register is valid (e.g., based on field 556). If not, flow proceeds to 870 and the processor re-executes the load. If so, flow proceeds to 830. At 830, control circuitry checks whether the live-out mask indicates data independence (e.g., whether source registers for the load are clear in the live-out mask). If not, flow proceeds to 870, otherwise flow proceeds to 840.

At 840, control circuitry checks for a hit in the Bloom filter 480. If there is a hit, flow proceeds to 870, otherwise flow proceeds to 850. At 850, control circuitry re-uses information from the load. In particular, control circuitry uses the same destination physical register tag for the rename operation and leaves the register valid array set for that register. This allows the load to complete (and any younger instructions that depend on results of the load can proceed) rather than re-executing the load.

Note that the conditions for re-using load information of FIG. 8 are included for purposes of explanation but are not intended to limit the scope of the present disclosure. In other embodiments, illustrated conditions may be omitted, additional conditions may be considered, conditions may be considered according to various logical combinations rather than the illustrated logical AND of conditions at elements 810-840, etc.

Figure 9:
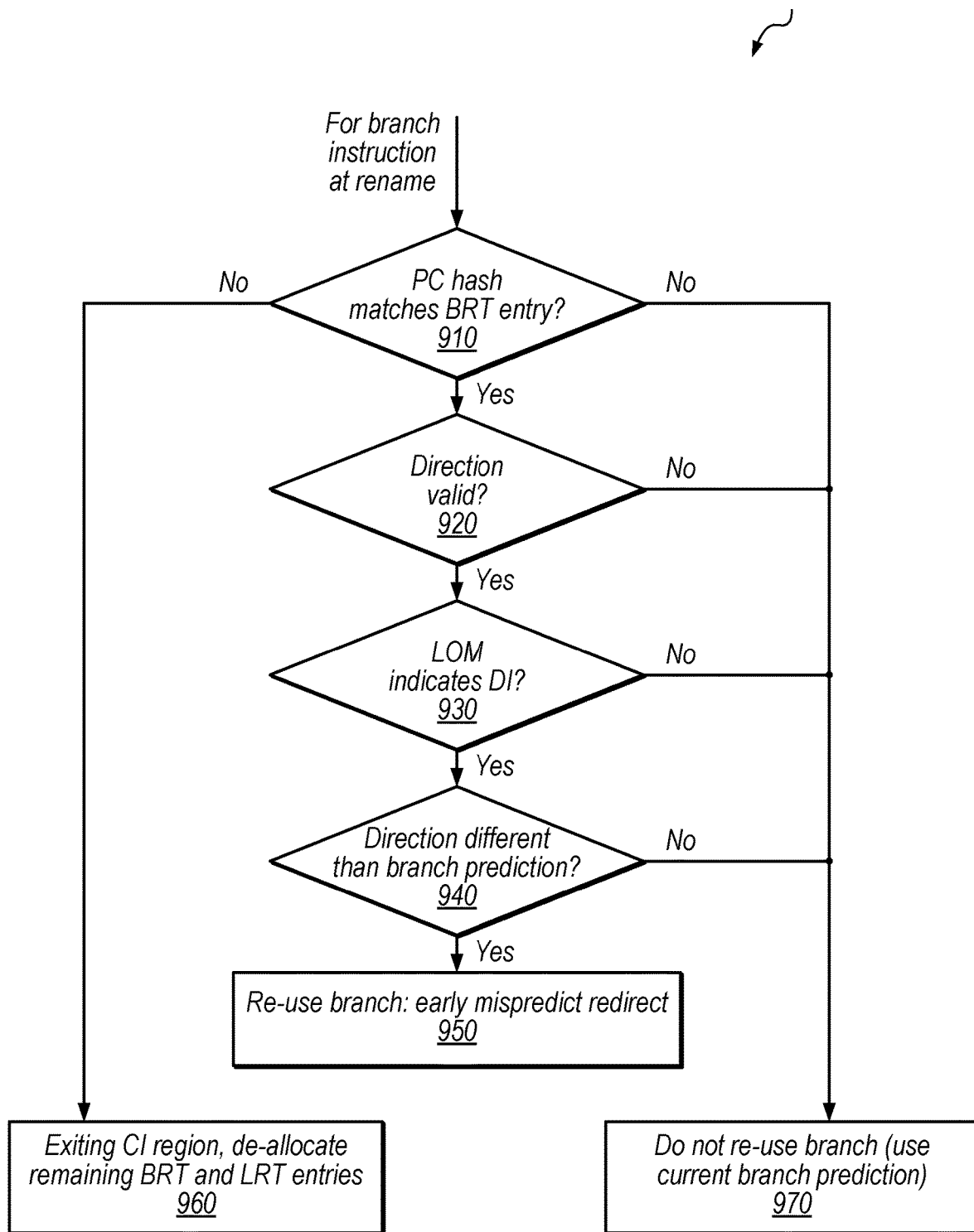
FIG. 9 is a flow diagram illustrating an example branch direction re-use technique, according to some embodiments.

FIG. 9 is a flow diagram illustrating an example branch direction re-use technique, according to some embodiments. At 910, in the illustrated example, control circuitry receives a branch instruction for rename (e.g., after a flush due to a misprediction, such that result information for the branch is potentially saved in the branch re-use table 475). The control circuitry determines whether a hash of the program counter of the branch matches an entry in the branch re-use table 475. If not, flow proceeds to 960, the control independent region is exited, and control circuitry de-allocates remaining branch re-use table entries and load re-use table entries. This may correspond to termination of control-independence-driven re-use for that particular misprediction.

If the hash of the program counter matches an entry in the branch re-use table 475, flow proceeds to 920 and control circuitry determines whether the direction for the branch is valid (e.g., based on field 526). If not, flow proceeds to 970 and the processor does not re-use information from the prior execution of the branch (rather, it may use the current branch prediction from a branch predictor and eventually complete and commit the branch). Otherwise, flow proceeds to 930.

At 930, control circuitry determines whether the live-out mask indicates data independence. If not, flow proceeds to 970, otherwise flow proceeds to 940. At 940, control circuitry determines whether the direction is different than a branch prediction for the branch. If not, flow proceeds to 970 (there is no need to take further re-use action, given that the re-use information matches the prediction). Otherwise, flow proceeds to 950 and the control circuitry re-uses information from the prior execution of the branch. In this case, the control circuitry indicates a misprediction and re-directs the processor front end (e.g., because the re-used direction indicates that the predicted direction is wrong).

As discussed above, in some embodiments the target of the branch may also be saved and may be used for the redirect at 950.

Note that the conditions for re-using branch information of FIG. 9 are included for purposes of explanation but are not intended to limit the scope of the present disclosure. In other embodiments, illustrated conditions may be omitted, additional conditions may be considered, conditions may be considered according to various logical combinations rather than the illustrated logical AND of conditions at elements 910-940, etc.

Example Implementations with Only Load Re-Use or Only Branch Re-Use

Figure 10:
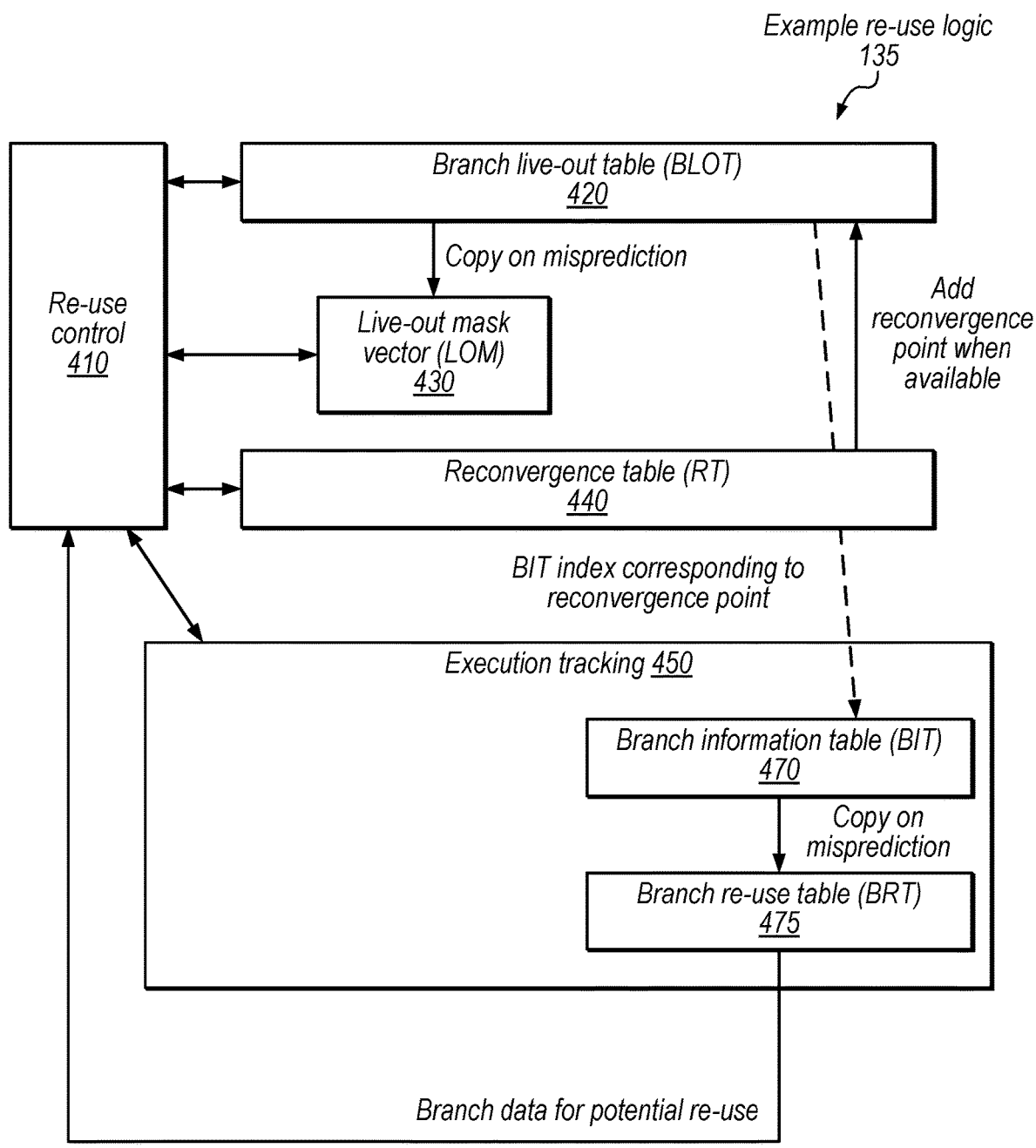
FIG. 10 is a block diagram illustrating detailed example re-use logic configured to re-use branch results, according to some embodiments.
Figure 11:
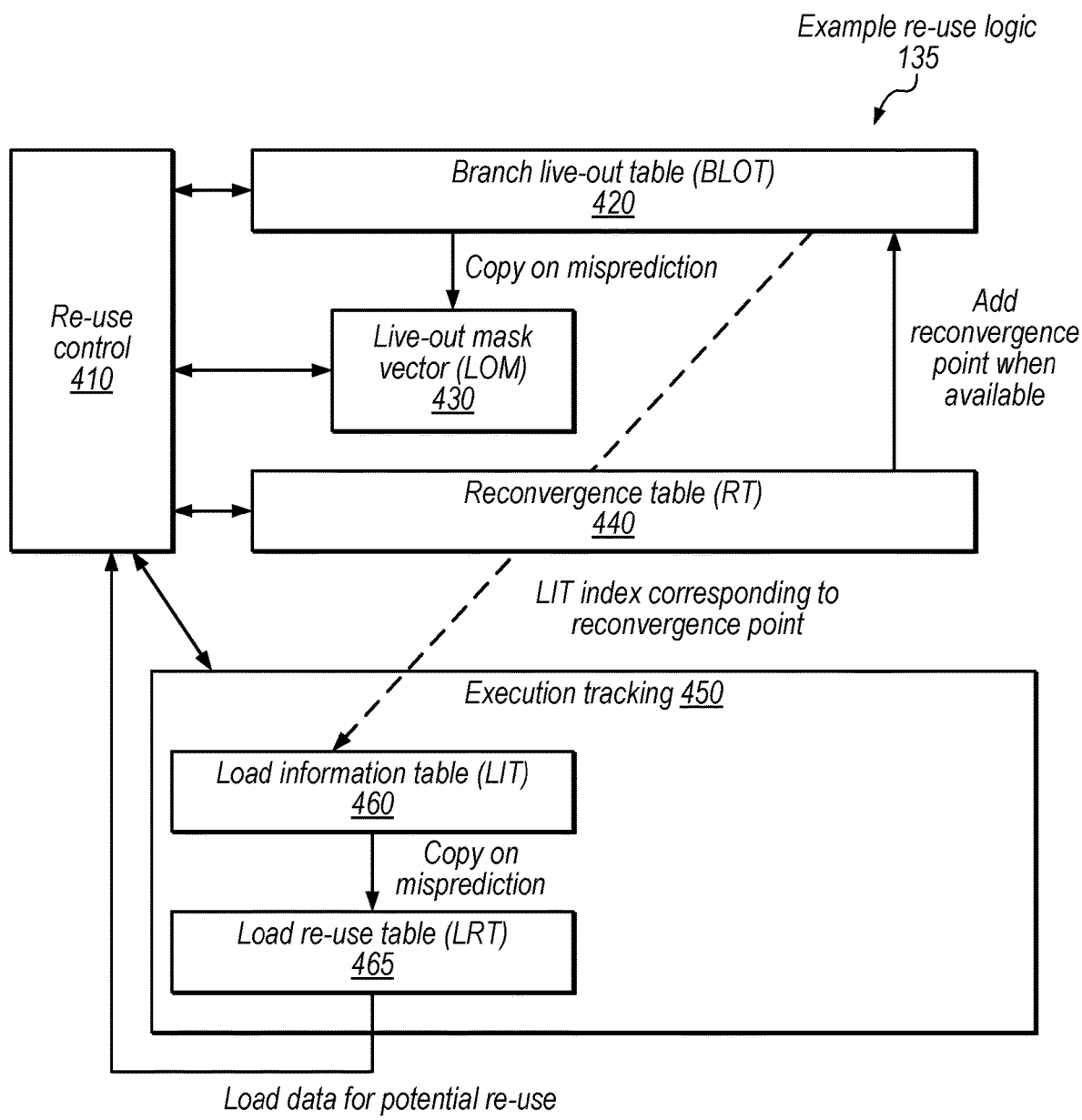
FIG. 11 is a block diagram illustrating detailed example re-use logic configured to re-use load results, according to some embodiments.

FIG. 10 is a block diagram illustrating an example of re-use logic 135 that implements branch re-use but not load re-use. FIG. 11 is a block diagram illustrating an example of re-use logic 135 that implements load re-use and not branch re-use. Elements of FIGS. 10 and 11 may be configured as discussed above with reference to FIG. 4. Also, the implementation of FIG. 11 shows that disclosed load re-use techniques may operate without elements 480, 485, and 490, in some embodiments. While branch or load re-use may be omitted, note that utilizing both may advantageously have synergistic effects, e.g., by sharing structures such as the live-out table and reconvergence table. Further, in some embodiments, results from a bad path for other types of instructions may also be re-used. Generally, re-use may be most beneficial for instructions whose results utilize substantial processing resources to compute.

Example Methods

Figure 12:
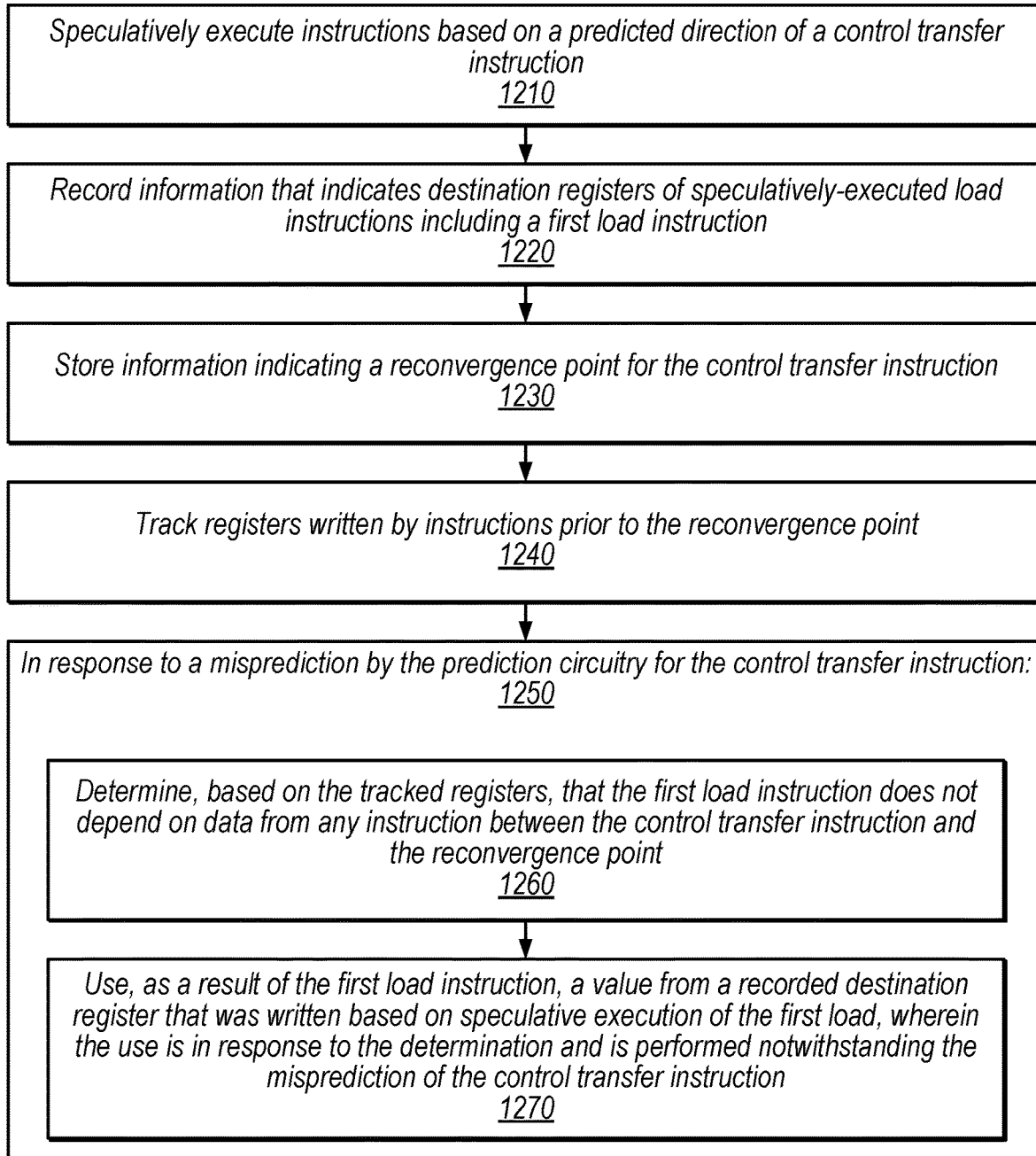
FIGS. 12-13 are flow diagrams illustrating example methods, according to some embodiments.

FIG. 12 is a flow diagram illustrating an example method for load re-use, according to some embodiments. The method shown in FIG. 12 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1210, in the illustrated embodiment, a processor speculatively executes instructions based on a predicted direction of a control transfer instruction.

At 1220, in the illustrated embodiment, the processor records (e.g., in load information table 460, load re-use table 465, or both) information that indicates destination registers of speculatively-executed load instructions including a first load instruction.

In some embodiments, the result storage circuitry is configured to record information that indicates destination physical registers of speculatively-executed load instructions. Re-use control circuitry may prevent freeing of a first physical register that is indicated by the result storage circuitry to store the value for the first load instruction and use the value from the first physical register for the first load. Load information table register valid array circuitry (e.g., circuitry 485) may indicate a set of physical registers that store values for potential re-use (which may prevent freeing of those registers on a flush).

At 1230, in the illustrated embodiment, the processor stores (e.g., in control flow tracker circuitry such as branch live-out table 420, reconvergence table 440, or both) information indicating a reconvergence point for the control transfer instruction. In some embodiments, the control flow tracker circuitry stores, for the control transfer instruction, a location in the result storage circuitry corresponding to the reconvergence point (e.g., in field 510 of the branch live-out table 420).

At 1240, in the illustrated embodiment, the processor (e.g., re-use control 410) tracks registers written by instructions prior to the reconvergence point (e.g., using live-out fields discussed above).

At 1250, in the illustrated embodiment, in response to a misprediction by the prediction circuitry for the control transfer instruction, the processor performs elements 1260 and 1270. Note that there may be a flush as a result of the misprediction and the first load instruction may eventually be replayed. Elements 1260 and 1270 may correspond to the replay of the first load instruction.

In some embodiments, re-use control circuitry, in response to the misprediction, copies entries for instructions after the reconvergence point from the result storage circuitry to re-use storage circuitry (e.g., from load information table 460 to load re-use table 465).

At 1260, in the illustrated embodiment, the processor determines, based on the tracked registers, that the first load instruction does not depend on data from any instruction between the control transfer instruction and the reconvergence point. Thus, the first load instruction is data independent. The first load instruction may also be control independent, based on its relationship to the reconvergence point and the misprediction direction. In this example, the first load instruction is also control independent.

In some embodiments, to determine that the first load instruction does not depend on data from any instruction between the control transfer instruction and the reconvergence point, the re-use control circuitry tracks registers written by instructions after the reconvergence point that do not use source data from registers written by instructions prior to the reconvergence point. For example, the control flow tracker circuitry may include a live-out mask field that includes a respective indicator per architectural register for a set of architectural registers supported by the apparatus. The re-use control circuitry may set an indicator in the live-out mask field in response to a write to the corresponding architectural register by an instruction between the control transfer instruction and the reconvergence point and may clear an indicator in the live-out mask field in response to a write to the corresponding architectural register by an instruction subsequent to the reconvergence point that does not depend on any instruction between the control transfer instruction and the reconvergence point.

At 1270, in the illustrated embodiment, the processor uses, as a result of the first load instruction, a value from a recorded destination register that was written based on speculative execution of the first load. In this example, the use is in response to the determination that the first load instruction is data independent (and may also be based on a determination that the first load instruction is control independent) and is performed notwithstanding the misprediction of the control transfer instruction. Thus, in this example, the speculative result of the first load instruction from the bad path is re-used.

In some embodiments, re-use control circuitry compares a hash of a program counter to a tag field of a re-use storage circuitry entry to determine an identity of the destination register. For example, the re-use control circuitry may CAM a hash of the PC of the first load instruction to field 552 of load re-use table 465.

In some embodiments, the re-use control circuitry is configured to use the value from the destination register further based on a comparison based on a program counter of the first load on a re-execution of the first load with a field of an entry in the result storage circuitry for the first load and a determination that the destination register is valid.

In some embodiments, filter circuitry (e.g., circuitry 480) prevents re-use of a value of a load instruction based on an incorrectly re-used value for the load instruction due to a forwarded store instruction result. In some embodiments index map circuitry (e.g., circuitry 490) maps an entry in the control flow tracker circuitry to an entry in the result storage circuitry.

Figure 13:
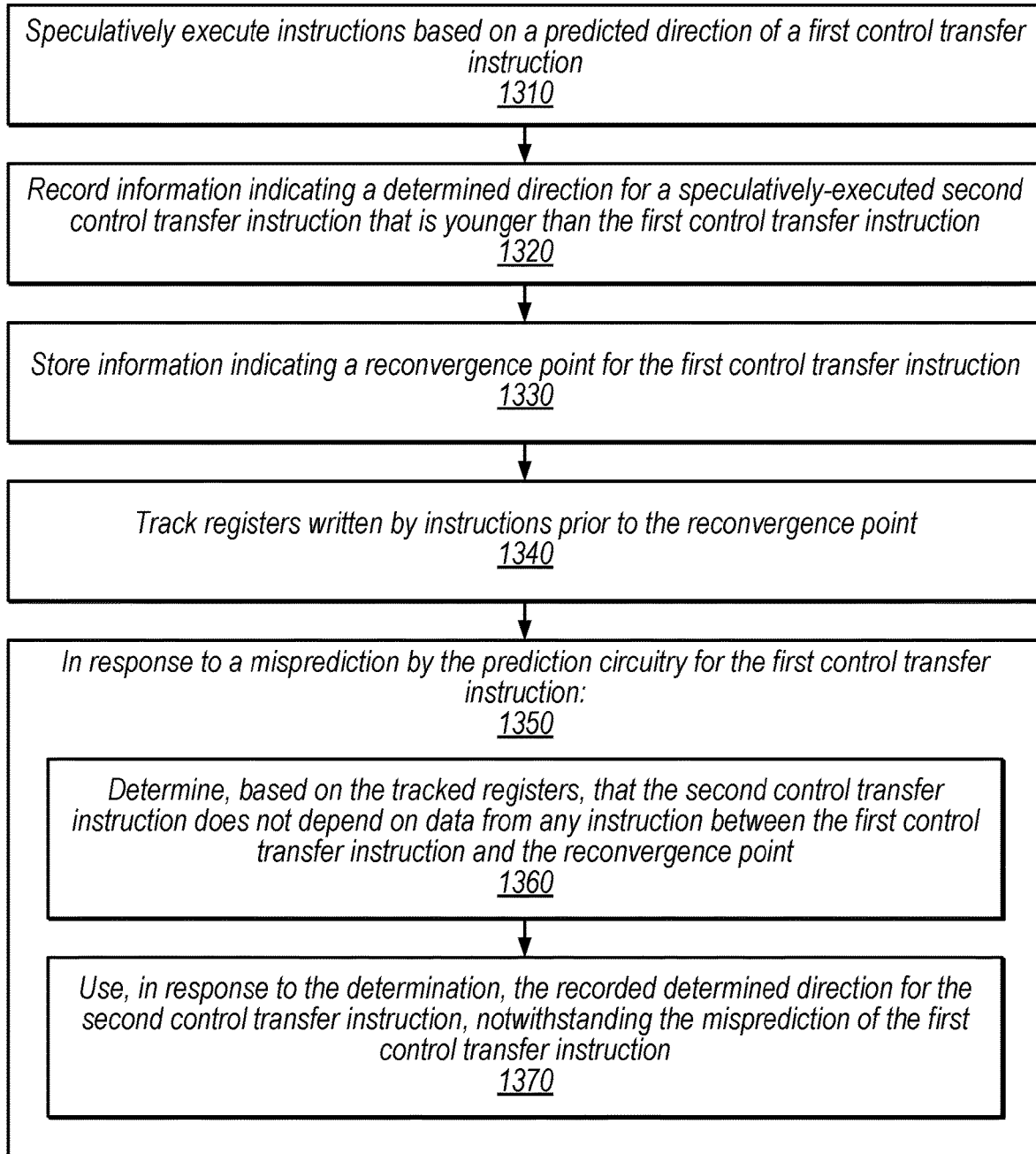

FIG. 13 is a flow diagram illustrating an example method for branch re-use, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, a processor speculatively executes instructions based on a predicted direction of a first control transfer instruction.

At 1320, in the illustrated embodiment, the processor records information (e.g., in branch information table 470, branch re-use table 475, or both) indicating a determined direction for a speculatively-executed second control transfer instruction that is younger than the first control transfer instruction.

At 1330, in the illustrated embodiment, the processor stores (e.g., in branch live-out table 420, reconvergence table 440, or both) information indicating a reconvergence point for the first control transfer instruction.

In some embodiments, to determine the reconvergence point, control circuitry stores multiple ranges of instruction addresses corresponding to executed instructions between control transfer instructions and, during replay of instructions subsequent to the misprediction, determines the reconvergence point based on a match between a current program counter and one of the ranges of instructions. In some embodiments, re-use control circuitry populates a field indicating the reconvergence point and a reconvergence-point-found field in the control flow tracker circuitry.

At 1340, in the illustrated embodiment, the processor (e.g., re-use control 410 in a live-out mask field) tracks registers written by instructions prior to the reconvergence point. In some embodiments, control flow tracker circuitry includes a live-out mask field that includes a respective indicator per architectural register for a set of architectural registers supported by the processor. In some embodiments, re-use control circuitry is configured to: set an indicator in the live-out mask field in response to a write to the corresponding architectural register by an instruction between the first control transfer instruction and the reconvergence point, clear an indicator in the live-out mask field in response to a write to the corresponding architectural register by an instruction subsequent to the reconvergence point that does not depend on any instruction between the first control transfer instruction and the reconvergence point, determine that the second control transfer instruction does not depend on data from any instruction between the first control transfer instruction and the reconvergence point based on one or more indicators in the live-out mask field, that correspond to one or more input operands of the second control transfer instruction, being clear.

In some embodiments, processor front-end circuitry is configured to decode multiple instructions in a given cycle and re-use control circuitry is configured to, for one or more of multiple instructions decoded in a given cycle, assume that live-out mask field bits are set for targets of one or more other instructions decoded in the given cycle. This may provide fast live-out mask updates, in some embodiments. In some embodiments, re-use control circuitry copies the live-out mask field to re-use storage circuitry in response to the mispredict. In some embodiments, the re-use control circuitry, in response to the misprediction, copies entries for instructions after the reconvergence point from result storage circuitry to re-use storage circuitry.

At 1350, in the illustrated embodiment, in response to a misprediction by the prediction circuitry for the first control transfer instruction, the processor performs elements 1360 and 1370.

At 1360, in the illustrated embodiment, the processor determines, based on the tracked registers, that the second control transfer instruction does not depend on data from any instruction between the first control transfer instruction and the reconvergence point.

At 1370, in the illustrated embodiment, the processor uses, in response to the determination, the recorded determined direction for the second control transfer instruction, notwithstanding the misprediction of the first control transfer instruction. The use may include initiating a mispredicted redirect to redirect the front-end circuitry to fetch based on the determined direction.

In some embodiments, re-use control circuitry also, uses, from the result storage circuitry in response to the determination, a determined destination for the second control transfer instruction. In some embodiments, the use of the recorded determined direction is performed for the second control transfer instruction after a flush and replay of the second control transfer instruction, wherein the apparatus is configured not to re-determine the direction for the second control transfer instruction based on use of the recorded determined direction.

In some embodiments, the use of the recorded determined direction is conditioned on a comparison based on a program counter of the second control transfer instruction on a re-execution of the second control transfer instruction with a field of an entry in the result storage circuitry for the second control transfer instruction, a determination that the determined direction is valid, and a determination that determined direction is different than a directed for the second control transfer instructions predicted by the prediction circuitry.

Disclosed techniques may also be used for speculatively executed load operations that are incorrect (e.g., predicted load addresses or values that are incorrect). In some embodiments, the re-use control circuitry is configured to use a predicted direction for a third control transfer instruction that was speculatively executed subsequent to a speculatively-executed incorrect load operation.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

For a given program or portion of a program, flow typically proceeds in a sequential fashion. Consider the following group of instructions: ld mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). Note that sequential circuitry may perform operations on a rising edge of a clock signal, a falling edge of a clock signal, or both (which may be referred to as dual-edge triggered).

Example Device

Figure 14:
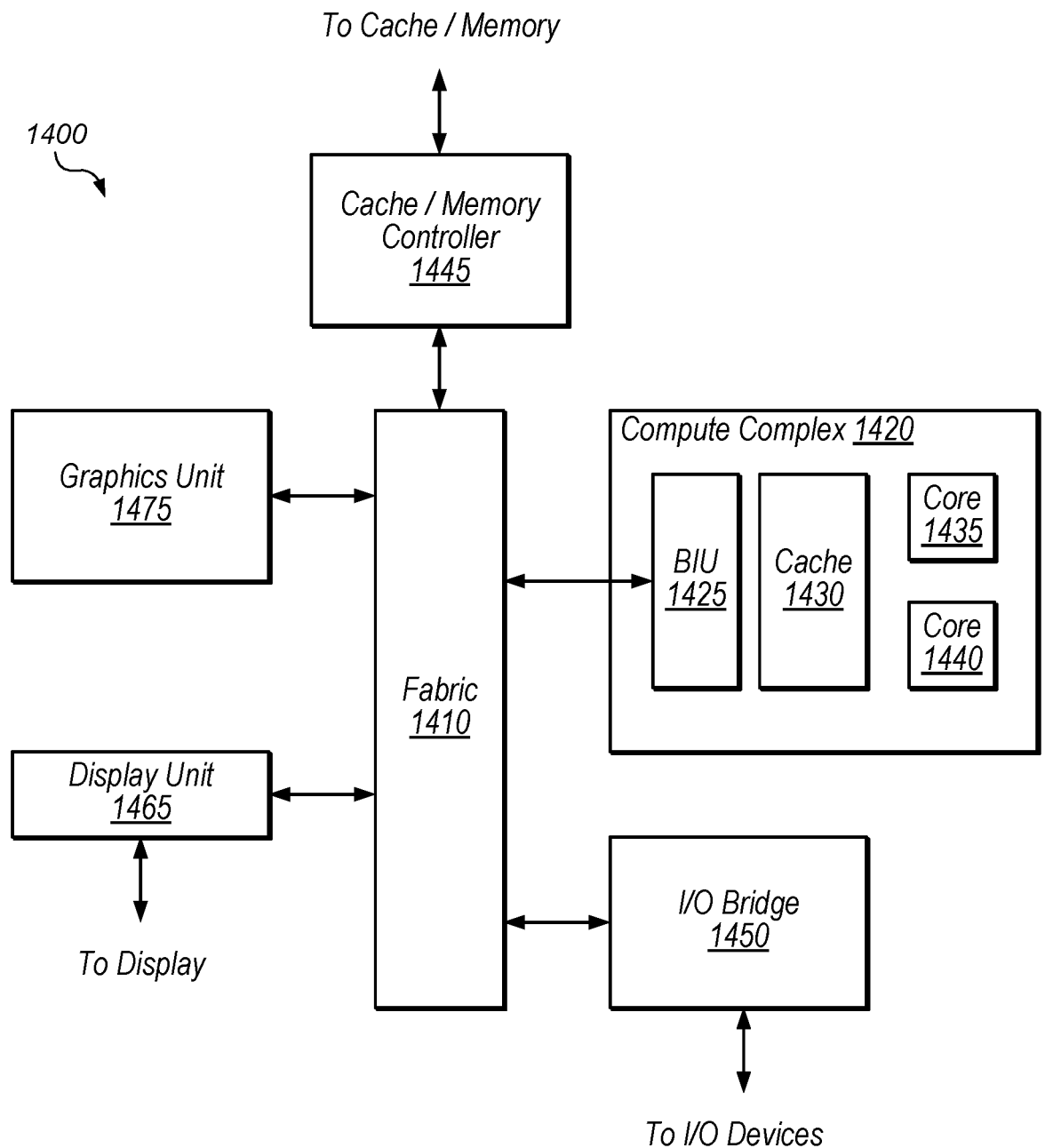
FIG. 14 is a block diagram illustrating an example computing device, according to some embodiments.

Referring now to FIG. 14, a block diagram illustrating an example embodiment of a device 1400 is shown. In some embodiments, elements of device 1400 may be included within a system on a chip. In some embodiments, device 1400 may be included in a mobile device, which may be battery-powered. Therefore, power consumption by device 1400 may be an important design consideration. In the illustrated embodiment, device 1400 includes fabric 1410, compute complex 1420 input/output (I/O) bridge 1450, cache/memory controller 1445, graphics unit 1475, and display unit 1465. In some embodiments, device 1400 may include other components (not shown) in addition to or in place of the illustrated components, such as video processor encoders and decoders, image processing or recognition elements, computer vision elements, etc.

Fabric 1410 may include various interconnects, buses, MUX's, controllers, etc., and may be configured to facilitate communication between various elements of device 1400. In some embodiments, portions of fabric 1410 may be configured to implement various different communication protocols. In other embodiments, fabric 1410 may implement a single communication protocol and elements coupled to fabric 1410 may convert from the single communication protocol to other communication protocols internally.

In the illustrated embodiment, compute complex 1420 includes bus interface unit (BIU) 1425, cache 1430, and cores 1435 and 1440. In various embodiments, compute complex 1420 may include various numbers of processors, processor cores and caches. For example, compute complex 1420 may include 1, 2, or 4 processor cores, or any other suitable number. In one embodiment, cache 1430 is a set associative L2 cache. In some embodiments, cores 1435 and 1440 may include internal instruction and data caches. In some embodiments, a coherency unit (not shown) in fabric 1410, cache 1430, or elsewhere in device 1400 may be configured to maintain coherency between various caches of device 1400. BIU 1425 may be configured to manage communication between compute complex 1420 and other elements of device 1400. Processor cores such as cores 1435 and 1440 may be configured to execute instructions of a particular instruction set architecture (ISA) which may include operating system instructions and user application instructions.

In some embodiments, disclosed re-use techniques may advantageously improve the performance of compute complex 1420, e.g., by mitigating the negative effects of mispredictions for control transfer instructions.

Cache/memory controller 1445 may be configured to manage transfer of data between fabric 1410 and one or more caches and memories. For example, cache/memory controller 1445 may be coupled to an L3 cache, which may in turn be coupled to a system memory. In other embodiments, cache/memory controller 1445 may be directly coupled to a memory. In some embodiments, cache/memory controller 1445 may include one or more internal caches.

As used herein, the term "coupled to" may indicate one or more connections between elements, and a coupling may include intervening elements. For example, in FIG. 14, graphics unit 1475 may be described as "coupled to" a memory through fabric 1410 and cache/memory controller 1445. In contrast, in the illustrated embodiment of FIG. 14, graphics unit 1475 is "directly coupled" to fabric 1410 because there are no intervening elements.

Graphics unit 1475 may include one or more processors, e.g., one or more graphics processing units (GPU's). Graphics unit 1475 may receive graphics-oriented instructions, such as OPENGL®, Metal, or DIRECT3D® instructions, for example. Graphics unit 1475 may execute specialized GPU instructions or perform other operations based on the received graphics-oriented instructions. Graphics unit 1475 may generally be configured to process large blocks of data in parallel and may build images in a frame buffer for output to a display, which may be included in the device or may be a separate device. Graphics unit 1475 may include transform, lighting, triangle, and rendering engines in one or more graphics processing pipelines. Graphics unit 1475 may output pixel information for display images. Graphics unit 1475, in various embodiments, may include programmable shader circuitry which may include highly parallel execution cores configured to execute graphics programs, which may include pixel tasks, vertex tasks, and compute tasks (which may or may not be graphics-related).

Note that disclosed re-use techniques may also be used in graphics units and other special-purpose processors, in some embodiments.

Display unit 1465 may be configured to read data from a frame buffer and provide a stream of pixel values for display. Display unit 1465 may be configured as a display pipeline in some embodiments. Additionally, display unit 1465 may be configured to blend multiple frames to produce an output frame. Further, display unit 1465 may include one or more interfaces (e.g., MIPI® or embedded display port (eDP)) for coupling to a user display (e.g., a touchscreen or an external display).

I/O bridge 1450 may include various elements configured to implement: universal serial bus (USB) communications, security, audio, and low-power always-on functionality, for example. I/O bridge 1450 may also include interfaces such as pulse-width modulation (PWM), general-purpose input/output (GPIO), serial peripheral interface (SPI), and inter-integrated circuit (I2C), for example. Various types of peripherals and devices may be coupled to device 1400 via I/O bridge 1450.

In some embodiments, device 1400 includes network interface circuitry (not explicitly shown), which may be connected to fabric 1410 or I/O bridge 1450. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1400 with connectivity to various types of other devices and networks.

Example Applications

Figure 15:
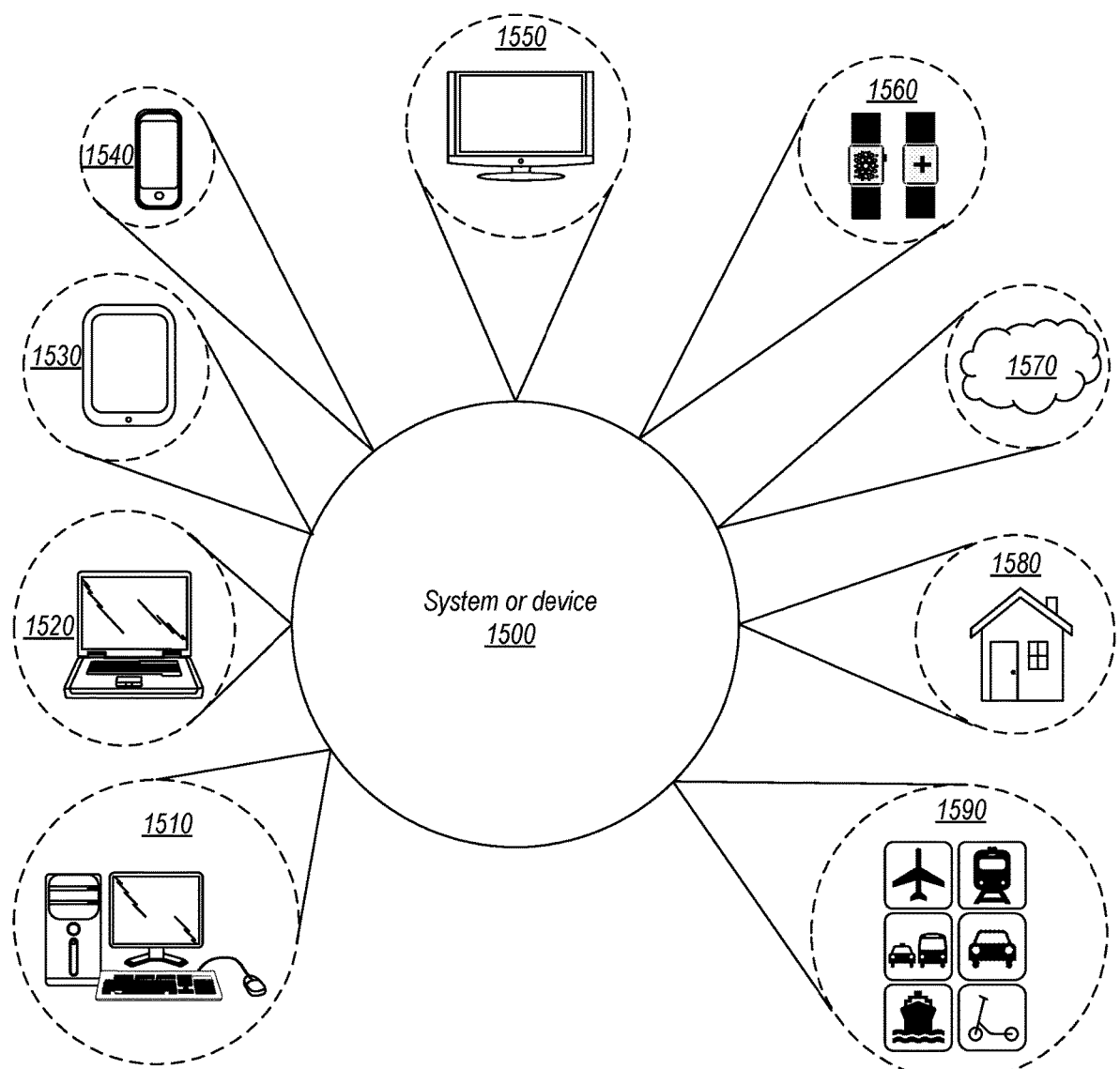
FIG. 15 is a diagram illustrating example applications of disclosed systems and devices, according to some embodiments.

Turning now to FIG. 15, various types of systems that may include any of the circuits, devices, or system discussed above. System or device 1500, which may incorporate or otherwise utilize one or more of the techniques described herein, may be utilized in a wide range of areas. For example, system or device 1500 may be utilized as part of the hardware of systems such as a desktop computer 1510, laptop computer 1520, tablet computer 1530, cellular or mobile phone 1540, or television 1550 (or set-top box coupled to a television).

Similarly, disclosed elements may be utilized in a wearable device 1560, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1500 may also be used in various other contexts. For example, system or device 1500 may be utilized in the context of a server computer system, such as a dedicated server or on shared hardware that implements a cloud-based service 1570. Still further, system or device 1500 may be implemented in a wide range of specialized everyday devices, including devices 1580 commonly found in the home such as refrigerators, thermostats, security cameras, etc. The interconnection of such devices is often referred to as the "Internet of Things" (IoT). Elements may also be implemented in various modes of transportation. For example, system or device 1500 could be employed in the control systems, guidance systems, entertainment systems, etc. of various types of vehicles 1590.

The applications illustrated in FIG. 15 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 16:
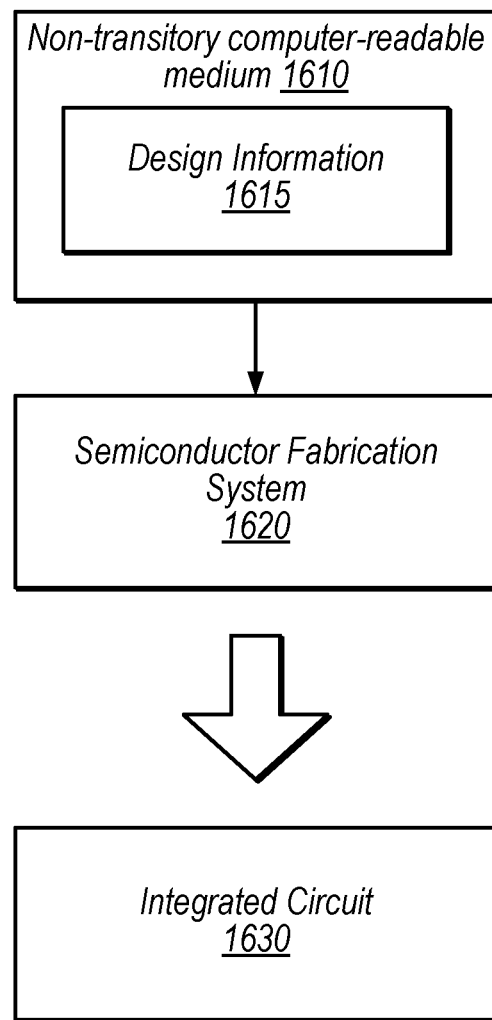
FIG. 16 is a block diagram illustrating an example computer-readable medium that stores circuit design information, according to some embodiments.

FIG. 16 is a block diagram illustrating an example non-transitory computer-readable storage medium that stores circuit design information, according to some embodiments. In the illustrated embodiment semiconductor fabrication system 1620 is configured to process the design information 1615 stored on non-transitory computer-readable medium 1610 and fabricate integrated circuit 1630 based on the design information 1615.

Non-transitory computer-readable storage medium 1610, may comprise any of various appropriate types of memory devices or storage devices. Non-transitory computer-readable storage medium 1610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1610 may include other types of non-transitory memory as well or combinations thereof. Non-transitory computer-readable storage medium 1610 may include two or more memory mediums which may reside in different locations, e.g., in different computer systems that are connected over a network.

Design information 1615 may be specified using any of various appropriate computer languages, including hardware description languages such as, without limitation: VHDL, Verilog, SystemC, System Verilog, RHDL, M, MyHDL, etc. Design information 1615 may be usable by semiconductor fabrication system 1620 to fabricate at least a portion of integrated circuit 1630. The format of design information 1615 may be recognized by at least one semiconductor fabrication system 1620. In some embodiments, design information 1615 may also include one or more cell libraries which specify the synthesis, layout, or both of integrated circuit 1630. In some embodiments, the design information is specified in whole or in part in the form of a netlist that specifies cell library elements and their connectivity. Design information 1615, taken alone, may or may not include sufficient information for fabrication of a corresponding integrated circuit. For example, design information 1615 may specify the circuit elements to be fabricated but not their physical layout. In this case, design information 1615 may need to be combined with layout information to actually fabricate the specified circuitry.

Integrated circuit 1630 may, in various embodiments, include one or more custom macrocells, such as memories, analog or mixed-signal circuits, and the like. In such cases, design information 1615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1620 may also be configured to perform various testing of fabricated circuits for correct operation.

In various embodiments, integrated circuit 1630 is configured to operate according to a circuit design specified by design information 1615, which may include performing any of the functionality described herein. For example, integrated circuit 1630 may include any of various elements shown in FIGS. 1, 4, 10, 11, and 13. Further, integrated circuit 1630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifics a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
   processor front-end circuitry configured to fetch and decode instructions;
   prediction circuitry configured predict directions of control transfer instructions;
   execution circuitry configured to speculatively execute instructions based on a predicted direction of a first control transfer instruction;
   result storage circuitry configured to record information indicating a determined direction for a speculatively-executed second control transfer instruction that is younger than the first control transfer instruction;
   control flow tracker circuitry configured to store information indicating a reconvergence point for the first control transfer instruction;
   re-use control circuitry configured to:
     track registers written by instructions prior to the reconvergence point;
     in response to a misprediction by the prediction circuitry for the first control transfer instruction:
       determine, based on the tracked registers, that the second control transfer instruction does not depend on data from any instruction between the first control transfer instruction and the reconvergence point;
       confirm that the determined direction is different than a direction for the second control transfer instruction predicted by the prediction circuitry; and
       use, in response to the determination and the confirmation, the recorded determined direction for the second control transfer instruction, notwithstanding the misprediction of the first control transfer instruction.

2. The apparatus of claim 1, wherein the re-use control circuitry is further configured to use, from the result storage circuitry in response to the determination, a determined destination for the second control transfer instruction.

3. The apparatus of claim 1, wherein the use of the recorded determined direction is performed for the second control transfer instruction after a flush and replay of the second control transfer instruction, wherein the apparatus is configured not to re-determine a direction for the second control transfer instruction based on use of the recorded determined direction.

4. The apparatus of claim 1, wherein:
   the control flow tracker circuitry includes a live-out mask field that includes a respective indicator per architectural register for a set of architectural registers supported by the apparatus;
   the re-use control circuitry is configured to:
     set an indicator in the live-out mask field in response to a write to the corresponding architectural register by an instruction between the first control transfer instruction and the reconvergence point;
clear an indicator in the live-out mask field in response to a write to the corresponding architectural register by an instruction subsequent to the reconvergence point that does not depend on any instruction between the first control transfer instruction and the reconvergence point; and
determine that the second control transfer instruction does not depend on data from any instruction between the first control transfer instruction and the reconvergence point based on one or more indicators in the live-out mask field, that correspond to one or more input operands of the second control transfer instruction, being clear.

5. The apparatus of claim 4, wherein:
the processor front-end circuitry is configured to decode multiple instructions in a given cycle; and
wherein the re-use control circuitry is configured to, for one or more of the multiple instructions decoded in the given cycle, assume that live-out mask field bits are set for targets of one or more other instructions decoded in the given cycle.

6. The apparatus of claim 4, wherein the re-use control circuitry is configured to copy the live-out mask field to re-use storage circuitry in response to the misprediction.

7. The apparatus of claim 1, wherein the re-use control circuitry is further configured to, in response to the misprediction, copy entries for instructions after the reconvergence point from the result storage circuitry to re-use storage circuitry.

8. The apparatus of claim 1, wherein the re-use control circuitry is further configured to determine the reconvergence point, including to:
store multiple ranges of instruction addresses corresponding to executed instructions between control transfer instructions; and
during replay of instructions subsequent to the misprediction, determine the reconvergence point based on a match between a current program counter and one of the ranges of instruction addresses.

9. The apparatus of claim 1, wherein, to use the determined direction for the second control transfer instruction, the re-use control circuitry is configured to initiate a mispredict redirect to redirect the front-end circuitry to fetch based on the determined direction.

10. The apparatus of claim 9, wherein the re-use control circuitry is configured to populate a field indicating the reconvergence point and a reconvergence-point-found field in the control flow tracker circuitry.

11. The apparatus of claim 1, wherein the re-use control circuitry is configured to re-use the determined direction for the second control transfer instruction based on:
a comparison based on a program counter of the second control transfer instruction on a re-execution of the second control transfer instruction with a field of an entry in the result storage circuitry for the second control transfer instruction; and
a determination that the determined direction is valid.

12. The apparatus of claim 1, wherein:
the re-use control circuitry is configured to use a stored predicted direction from the result storage circuitry for a third control transfer instruction that was speculatively executed subsequent to a speculatively-executed incorrect load operation.

13. The apparatus of claim 1, wherein the apparatus is a computing device that further includes:
a central processing unit;
a display; and
network interface circuitry.

14. A method, comprising:
speculatively executing, by a computing device, instructions based on a predicted direction of a first control transfer instruction;
recording, by the computing device, information indicating a determined direction for a speculatively-executed second control transfer instruction that is younger than the first control transfer instruction;
storing, by the computing device, information indicating a reconvergence point for the first control transfer instruction;
tracking, by the computing device, registers written by instructions prior to the reconvergence point;
in response to a misprediction for the first control transfer instruction, the computing device:
determining, based on the tracked registers, that the second control transfer instruction does not depend on data from any instruction between the first control transfer instruction and the reconvergence point;
confirming that the determined direction is different than a predicted direction for the second control transfer instruction; and
using, in response to the determination and the confirmation, the recorded determined direction for the second control transfer instruction, notwithstanding the misprediction of the first control transfer instruction.

15. The method of claim 14, further comprising:
setting, by the computing device, an indicator in a live-out mask field in response to a write to the corresponding architectural register by an instruction between the first control transfer instruction and the reconvergence point; and
clearing, by the computing device, an indicator in the live-out mask field in response to a write to the corresponding architectural register by an instruction subsequent to the reconvergence point that does not depend on any instruction between the first control transfer instruction and the reconvergence point;
wherein the determining is based on one or more indicators in the live-out mask field, that correspond to one or more input operands of the second control transfer instruction, being clear.

16. The method of claim 15, further comprising:
decoding, by the computing device, multiple instructions in a given cycle; and
for one or more of the multiple instructions decoded in the given cycle, assuming that live-out mask field bits are set for targets of one or more other instructions decoded in the given cycle.

17. The method of claim 14, further comprising:
storing, by the computing device, multiple ranges of instruction addresses corresponding to executed instructions between control transfer instructions and, during replay of instructions subsequent to the misprediction, determining the reconvergence point based on a match between a current program counter and one of the ranges of instruction addresses.

18. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
- processor front-end circuitry configured to fetch and decode instructions;
- prediction circuitry configured predict directions of control transfer instructions;
- execution circuitry configured to speculatively execute instructions based on a predicted direction of a first control transfer instruction;
- result storage circuitry configured to record information indicating a determined direction for a speculatively-executed second control transfer instruction that is younger than the first control transfer instruction;
- control flow tracker circuitry configured to store information indicating a reconvergence point for the first control transfer instruction;
- re-use control circuitry configured to:
  - track registers written by instructions prior to the reconvergence point;
  - in response to a misprediction by the prediction circuitry for the first control transfer instruction:
    - determine, based on the tracked registers, that the second control transfer instruction does not depend on data from any instruction between the first control transfer instruction and the reconvergence point; and
    - confirm that the determined direction is different than a direction for the second control transfer instruction predicted by the prediction circuitry; and
    - use, in response to the determination and the confirmation, the recorded determined direction for the second control transfer instruction, notwithstanding the misprediction of the first control transfer instruction.

19. The non-transitory computer readable storage medium of claim 18, wherein:
- the control flow tracker circuitry includes a live-out mask field that includes a respective indicator per architectural register for a set of architectural registers supported by the circuit;
- the re-use control circuitry is configured to:
  - set an indicator in the live-out mask field in response to a write to the corresponding architectural register by an instruction between the first control transfer instruction and the reconvergence point;
  - clear an indicator in the live-out mask field in response to a write to the corresponding architectural register by an instruction subsequent to the reconvergence point that does not depend on any instruction between the first control transfer instruction and the reconvergence point; and
  - determine that the second control transfer instruction does not depend on data from any instruction between the first control transfer instruction and the reconvergence point based on one or more indicators in the live-out mask field, that correspond to one or more input operands of the second control transfer instruction, being clear.

20. The non-transitory computer readable storage medium of claim 18, wherein, to use the determined direction for the second control transfer instruction, the re-use control circuitry is configured to initiate a mispredict redirect to redirect the front-end circuitry to fetch based on the determined direction.

* * * * *